US011720594B2

(12) United States Patent
Calder et al.

(10) Patent No.: US 11,720,594 B2
(45) Date of Patent: *Aug. 8, 2023

(54) SYNCHRONOUS REPLICATION IN A DISTRIBUTED STORAGE ENVIRONMENT

(71) Applicant: MICROSOFT TECHNOLOGY LICENSING, LLC, Redmond, WA (US)

(72) Inventors: Bradley Gene Calder, Bellevue, WA (US); Niranjan Nilakantan, Redmond, WA (US); Shashwat Srivastav, Seattle, WA (US); Jiesheng Wu, Redmond, WA (US); Abdul Rafay Abbasi, Redmond, WA (US); Shane Mainali, Duvall, WA (US); Padmanabha Chakravarthy Uddaraju, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1076 days.

This patent is subject to a terminal disclaimer.

(21) Appl. No.: 15/377,742

(22) Filed: Dec. 13, 2016

(65) Prior Publication Data

US 2017/0161350 A1     Jun. 8, 2017

Related U.S. Application Data

(63) Continuation of application No. 13/113,702, filed on May 23, 2011, now Pat. No. 9,519,555.

(51) Int. Cl.
    *G06F 16/27*     (2019.01)
    *G06F 16/23*     (2019.01)
    *G06F 11/20*     (2006.01)

(52) U.S. Cl.
    CPC ........ *G06F 16/275* (2019.01); *G06F 11/2076* (2013.01); *G06F 16/2343* (2019.01);
    (Continued)

(58) Field of Classification Search
    CPC .............. G06F 16/275; G06F 16/2343; G06F 16/2379; G06F 16/27; G06F 15/16;
    (Continued)

(56) References Cited

U.S. PATENT DOCUMENTS 4,412,285 A    10/1983   Neches
5,613,113 A    3/1997   Goldring
(Continued)

FOREIGN PATENT DOCUMENTS

CN          1910555 A     2/2007
CN      102024022 A     4/2011
(Continued)

OTHER PUBLICATIONS

Daudjee et. al., "A Pure Lazy Technique for Scalable Transaction Processing in Replicated Databases", In Proceedings of the 11th International Conference on Parallel and Distributed Systems, vol. 01, Jul. 2005, 7 pages.
(Continued)

*Primary Examiner* — Marcin R Filipczyk
(74) *Attorney, Agent, or Firm* — Shook, Hardy & Bacon L.L.P.

(57) ABSTRACT

Embodiments of the present invention relate to synchronously replicating data in a distributed computing environment. To achieve synchronous replication both an eventual consistency approach and a strong consistency approach are contemplated. Received data may be written to a log of a primary data store for eventual committal. The data may then be annotated with a record, such as a unique identifier, which facilitates the replay of the data at a secondary data
(Continued)

store. Upon receiving an acknowledgment that the secondary data store has written the data to a log, the primary data store may commit the data and communicate an acknowledgment of success back to the client. In a strong consistency approach, the primary data store may wait to send an acknowledgement of success to the client until it receives an acknowledgment that the secondary has not only written, but also committed, the data.

20 Claims, 11 Drawing Sheets

(52) U.S. Cl.
CPC ...... *G06F 16/2379* (2019.01); *G06F 11/2074* (2013.01); *G06F 16/27* (2019.01); *G06F 2201/855* (2013.01)

(58) Field of Classification Search
CPC ............. G06F 11/2076; G06F 11/2074; G06F 2201/855; G06F 12/00
See application file for complete search history.

(56) References Cited

U.S. PATENT DOCUMENTS

| | | | |
|---|---|---|---|
| 5,987,506 A | 11/1999 | Carter et al. | |
| 6,498,793 B1 | 12/2002 | Haviland | |
| 7,177,866 B2 | 2/2007 | Holenstein et al. | |
| 7,203,731 B1 | 4/2007 | Coates et al. | |
| 7,203,796 B1 | 4/2007 | Muppalaneni et al. | |
| 7,383,407 B1 | 6/2008 | Kiselev | |
| 7,483,922 B1 | 1/2009 | Edlund et al. | |
| 7,624,109 B2 | 11/2009 | Testardi | |
| 7,647,449 B1 | 1/2010 | Roy et al. | |
| 7,657,718 B1 | 2/2010 | LeCrone et al. | |
| 7,685,179 B2 | 3/2010 | MacCormick | |
| 7,779,218 B2 | 8/2010 | Fandel et al. | |
| 7,809,833 B2 | 10/2010 | Shen et al. | |
| 7,809,892 B1 | 10/2010 | Chatterjee et al. | |
| 7,818,297 B2 | 10/2010 | Peleg et al. | |
| 7,836,014 B2 | 11/2010 | Banks et al. | |
| 7,844,851 B2 | 11/2010 | Cosmadopoulos et al. | |
| 7,885,923 B1* | 2/2011 | Tawri ................... | G06F 11/2064 707/610 |
| 8,046,336 B1 | 10/2011 | Zhang et al. | |
| 8,085,813 B2 | 12/2011 | Melick et al. | |
| 8,341,134 B2 | 12/2012 | Bourbonnais et al. | |
| 8,407,190 B2* | 3/2013 | Prahlad ................... | H04L 67/56 707/692 |
| 8,572,031 B2* | 10/2013 | Merriman ........... | G06F 11/0709 707/613 |
| 8,626,709 B2* | 1/2014 | Isaacson ................. | G06F 16/27 707/613 |
| 8,751,863 B2 | 6/2014 | Calder et al. | |
| 8,762,336 B2 | 6/2014 | Calder et al. | |
| 8,868,492 B2 | 10/2014 | Garin, Jr. et al. | |
| 8,886,796 B2 | 11/2014 | Calder et al. | |
| 8,918,362 B2 | 12/2014 | Calder et al. | |
| 9,098,470 B2 | 8/2015 | Calder et al. | |
| 9,251,021 B2 | 2/2016 | Calder et al. | |
| 2003/0234714 A1 | 12/2003 | Sun et al. | |
| 2004/0098425 A1 | 5/2004 | Wiss et al. | |
| 2004/0250031 A1 | 12/2004 | Ji et al. | |
| 2005/0091391 A1 | 4/2005 | Burton et al. | |
| 2005/0131969 A1 | 6/2005 | Nishigaki | |
| 2005/0160315 A1 | 7/2005 | Chandrasekaran et al. | |
| 2005/0210073 A1 | 9/2005 | Oeda et al. | |
| 2008/0016300 A1 | 1/2008 | Yim et al. | |
| 2008/0071999 A1 | 3/2008 | Boyd et al. | |
| 2008/0243951 A1 | 10/2008 | Webman et al. | |
| 2009/0106455 A1* | 4/2009 | Xu ........................ | H04L 51/234 709/248 |
| 2009/0119349 A1 | 5/2009 | Edlund et al. | |
| 2009/0313311 A1 | 12/2009 | Hoffmann et al. | |
| 2009/0320049 A1 | 12/2009 | Thiel et al. | |
| 2010/0030818 A1 | 2/2010 | Cooper et al. | |
| 2010/0082540 A1 | 4/2010 | Isaacson et al. | |
| 2010/0106934 A1 | 4/2010 | Calder et al. | |
| 2010/0114824 A1 | 5/2010 | Krishnaprasad et al. | |
| 2010/0114830 A1 | 5/2010 | Vanhove et al. | |
| 2010/0235326 A1 | 9/2010 | Fashchik et al. | |
| 2010/0275055 A1 | 10/2010 | Edel et al. | |
| 2010/0332454 A1 | 12/2010 | Prahlad et al. | |
| 2011/0090896 A1 | 4/2011 | Bradley | |
| 2011/0099342 A1 | 4/2011 | Ozdemir | |
| 2012/0096308 A1 | 4/2012 | Yamagami | |
| 2012/0167098 A1 | 6/2012 | Lee et al. | |
| 2012/0254111 A1 | 10/2012 | Carmichael | |
| 2012/0254175 A1 | 10/2012 | Horowitz et al. | |
| 2012/0290714 A1 | 11/2012 | Cohen | |
| 2012/0303577 A1 | 11/2012 | Calder et al. | |
| 2012/0303912 A1 | 11/2012 | Calder et al. | |
| 2012/0311283 A1 | 12/2012 | Takahashi et al. | |
| 2013/0304714 A1 | 11/2013 | Lee et al. | |
| 2014/0289704 A1 | 9/2014 | Viswanathan et al. | |
| 2014/0358855 A1 | 12/2014 | Mielenhausen | |

FOREIGN PATENT DOCUMENTS

| | | |
|---|---|---|
| JP | H03250257 A | 11/1990 |
| JP | 2005267301 A | 9/2005 |
| WO | 2004031957 A1 | 4/2004 |

OTHER PUBLICATIONS

"Information on MySQL Cluster and MySQL Replication Retrieved on: Jan. 3, 2011. 8 pages Available at: http://www.clusterdb.com/mysql-cluster/setting-up-mysql-asynchronous-replication-for-high-availability/".

"Yahoo!'s Geo-Replication Service, PNUTS", Retrieved on: Jan. 3, 2011, 4 pages Available at: http://idleprocess.wordpress.com/2009/08/09/yahoos-geo-replication-service-pnuts/.

"Kosacek et al., "Building Highly Available Microsoft Clusters with Replicated Storage", Retrieved on Jan. 3, 2011, 4 pp. Available at: http://ftp.dell.com/app/ps-kosac.pdf".

"Synchronous Data Replication, Retrieved on: Dec. 29, 2010, 8 pages, available at: http://www.hds.com/assets/pdf/synchronous-data-replication-solutionsbrief.pdf".

"Deployment Guidelines for Exchange Server Multi-Site Data Replication", Retrieved on: Dec. 29, 2010, 6 pages, available at: http://technet.microsoft.com/en-us/library/bb124066%28EXCHG.65%29.aspx.

"Chapter 14. High Availability and Scalability, Retrieved on: Dec. 29, 2010, 6 pages Available at: http://dev.mysql.com/doc/refman/5.0/en/ha-overview.html".

"Using the Infonic Geo-Replicator over FleetBroadband, Published on: Oct. 24, 2007,7 pages Available at: http://satellitephonestore.net/inmarsat/FBB/docs/Using_the_Infonic_Geo-Replicator_over_FleetBroadband.pdf".

"Ramakrishnan, et al., ""Cloud Data Management @ Yahoo!"", Retrieved on: Dec. 29, 2010, 87 pages Available at: http://dasfaa2010.cs.tsukuba.ac.jp/talks/keynote_raghu.pdf".

"Koen, et al., ""Distributed Applications in Manufacturing Environments"", Retrieved on: Dec. 29, 2010, 6 pages, available at: http://msdn.microsoft.com/en-us/library/dd129909.aspx".

Rodrigues et al., The GLOBDATA Fault-Tolerant Replicated Distributed Object Database, Jul. 30, 2002, 18 pages.

International Search Report and Written Opinion dated Nov. 23, 2012 in International Patent Application No. PCT/US2012/038651, 10 pages.

Non-Final Office Action dated Dec. 21, 2012 in U.S. Appl. No. 13/113,688, 18 pages.

Final Office Action dated Oct. 9, 2013 in U.S. Appl. No. 13/113,688, 19 pages.

Extended European Search Report Issued for European Patent Application No. 12789199.2, dated Nov. 13, 2014, 6 pages.

(56) References Cited

OTHER PUBLICATIONS

Non-Final Office Action dated Jan. 30, 2015 in U.S. Appl. No. 13/113,688, 21 pages.
European Office Action dated Dec. 2, 2014 in European Patent Application No. 12789199.2, 1 page.
First Office Action Issued in Chinese Patent Application No. 201280025091.3, dated May 22, 2015, 11 Pages.
European Notice of Allowance dated Jul. 29, 2015 in Application No. 12789199.2, 7 pages.
Notice of Allowance dated Sep. 25, 2015 in U.S. Appl. No. 13/113,688, 8 pages.
Second Office Action dated Jan. 19, 2016 in Chinese Patent Application No. 201280025091.3, 6 pages.
International Search Report and Written Opinion dated Nov. 29, 2012 in International Patent Application No. PCT/US2012/038656, 17 pages.
Extended European Search Report Issued for European Patent Application No. 12790115.5, dated Nov. 13, 2014, 7 Pages.
European Notice of Allowance dated Jul. 21, 2015 in Application No. 12790115.5, 7 pages.
Non-Final Office Action dated Aug. 12, 2013 in U.S. Appl. No. 13/113,702, 13 pages.
Final Office Action dated Apr. 22, 2014 in U.S. Appl. No. 13/113,702, 13 pages.
Non-Final Office Action dated Nov. 6, 2014 in U.S. Appl. No. 13/113,702, 14 pages.
Notice of Allowance dated Aug. 12, 2016 in U.S. Appl. No. 13/113,702, 17 pages.
Final Office Action dated May 18, 2015 in U.S. Appl. No. 13/113,702, 18 pages.
First Office Action Issued in Chinese Patent Application No. 201280024902.8, dated May 28, 2015, 16 pages.
Second Office Action and Search Report Received for China Patent Application No. 201280024902.8, dated Jan. 28, 2016, 18 Pages.
Final Office Action dated Apr. 19, 2016 in U.S. Appl. No. 13/113,702, 22 pages.
Non-Final Office Action dated Sep. 23, 2015 in U.S. Appl. No. 13/113,702, 20 pages.
"Office Action Issued in Korean Patent Application No. 10-2013-7030957", dated Mar. 14, 2018, 6 Pages.
Non-Final Office Action dated Jun. 23, 2017 in U.S. Appl. No. 15/004,620, 25 pages.
Transaction+epoch+definition Jun. 15, 2017, Google, https://www.google.com/#q=transaction+epoch+definition.
Commit+epoch+RDBMS Jun. 15, 2017, Google, https://www.google.com/#q=commit+epoch+RDBMS.
Commit+epoch Jun. 15, 2017, Google, https://www.google.com/#q=commit+epoch.
iAPX 285 Programmer's Reference Manual 1983, Intel, 370 pages.
Geo-message Jun. 14, 2017, Google, https://www.google.com/#q=geo-message.
Final Office Action dated Jan. 11, 2018 in U.S. Appl. No. 15/004,620, 23 pages.
Lecture #3: Theoretical Foundations—Clocks in a Distributed Environment, 6 pages. [date unknown: captured by archive.org on Oct. 28, 2004], Florida State University, https://web.archive.org/web/20041028213335/http://www.cs.fsu.edu/-xyuan/cop5611/lecture5.html.
Colocation USA [Date uknown: captured by archive.org on Jan. 18, 2011], Data Center Map, 3 pages. https://web.archive.org/web/20110218023656/http://www.datacentermap.com/usa/.
"Notice of Allowance Issued in Chinese Patent Application No. 201280024902.8", dated Nov. 30, 2016, 4 Pages.
"Third Office Action Issued in Chinese Patent Application No. 201280024902.8", dated Aug. 10, 2016, 7 Pages.
"Notice of Allowance Issued in Japanese Patent Application No. 2014-512901", dated Oct. 6, 2016, 4 Pages.
"Office Action Issued in Japanese Patent Application No. 2014-512901", dated Apr. 27, 2016, 5 Pages.

\* cited by examiner

SYNCHRONOUS REPLICATION IN A DISTRIBUTED STORAGE ENVIRONMENT

CROSS-REFERENCE TO RELATED APPLICATIONS

This application is a continuation of, and claims priority to, U.S. application Ser. No. 15/377,742, filed on Dec. 13, 2016, entitled "SYNCHRONOUS REPLICATION IS A DISTRIBUTED STORAGE ENVIRONMENT"—which is incorporated herein in its entirety.

BACKGROUND

A distributed computing environment relies on geographically separate components, which may be connected by a network, to perform data storage and manipulation. A user of the distributed computing environment may desire to have data for one or more of their accounts maintained in a particular geographical location. For example, some customers may desire, for political reasons, to not have their data stored at a facility located in a particular country. Similarly, a customer may desire for their data to be stored in multiple geographical locations that are separate from one another to reduce potential availability issues surrounding a natural disaster. As a result, a customer may decide, on an account basis, to have data maintained and/or replicated in a variety of geographical locations. Providing a methodology for maintaining data at separate locations while providing acknowledgment of successful writing of that data is provided hereinafter.

SUMMARY

Embodiments of the present invention relate to systems, methods, and computer storage media for synchronously replicating data in a distributed computing environment. To achieve synchronous replication both an eventual consistency approach and a strong consistency approach are contemplated. Data is received at a primary data store from a client. The data may then be written to a log of the primary data store for eventual committal. The data is then annotated with a record, such as a unique identifier, which facilitates the replay of the data at a secondary data store. The annotated data is communicated from the primary data store to the secondary data store to be written to a log of the secondary data store. Upon receiving an acknowledgment that the secondary data store has written the data to a log, the primary data store may commit the data and communicate an acknowledgment of success back to the client. In a strong consistency approach, the primary data store may wait to send an acknowledgement of success to the client until it has received an acknowledgment that the secondary has not only written, but also committed, the data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
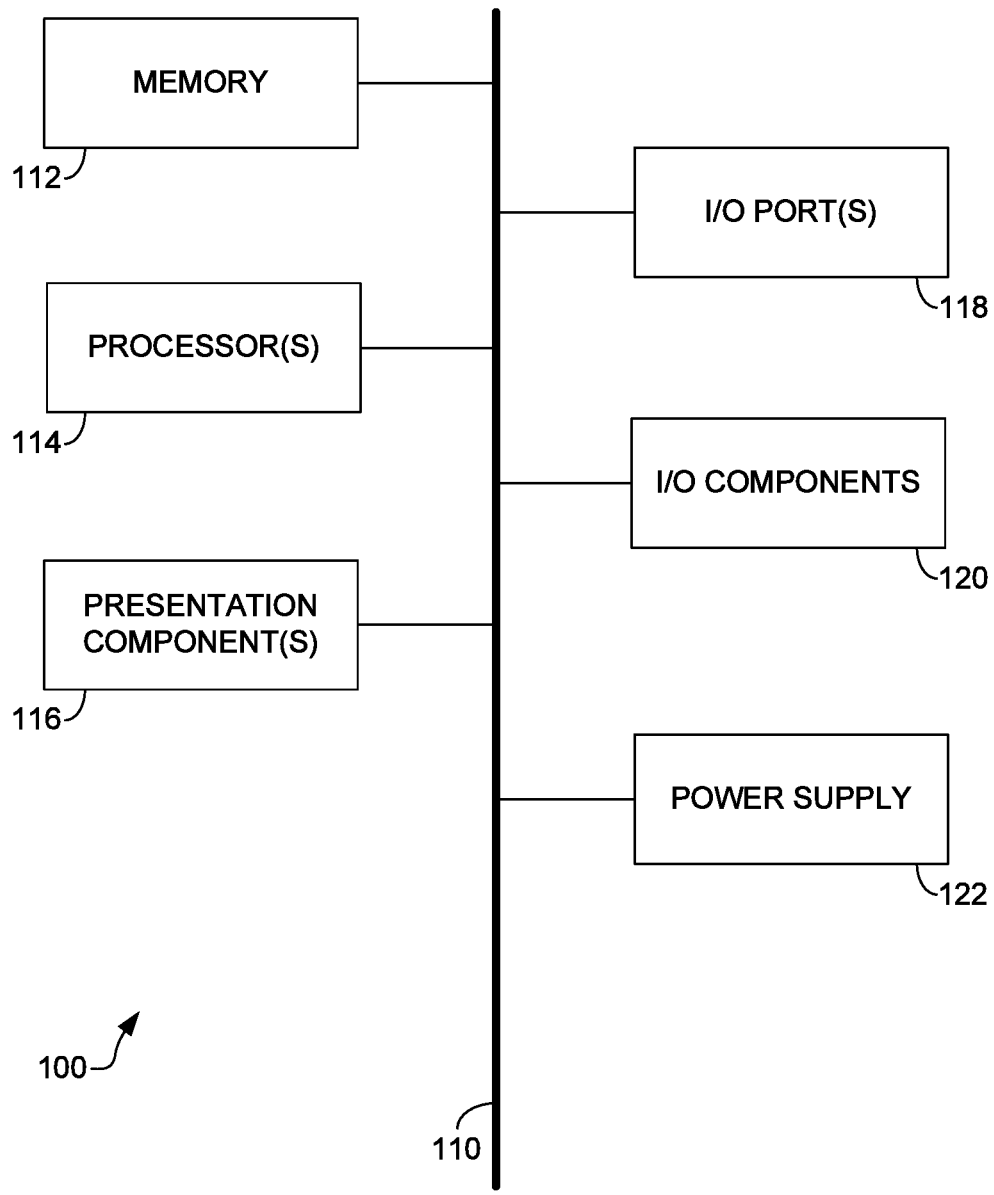
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for synchronously replicating data in a distributed computing environment. To achieve synchronous replication both an eventual consistency approach with strong consistency on failover and a strong consistency approach are contemplated. Data is received at a primary data store from a client. The data may then be written to a log of the primary data store for eventual committal. The data is then annotated with a record, such as a unique identifier, which facilitates the replay of the data at a secondary data store. The annotated data is communicated from the primary data store to the secondary data store to be written to a log of the secondary data store. Upon receiving an acknowledgment that the secondary data store has written the data to a log, the primary data store may commit the data and communicate an acknowledgment of success back to the client. In a strong consistency approach, the primary data store may wait to send an acknowledgement of success to the client until it has received an acknowledgment that the secondary has not only written, but also committed, the data.

Accordingly, in one aspect, the present invention provides a computer-implemented method in a distributed computing environment utilizing a processor and memory for synchronously geo-replicating data in the distributed computing environment. The method includes receiving data at a primary data store from a client. The method also includes writing the data to a log of the primary data store. Further, the method includes annotating the data written to the log with a record, the record allowing replay of the data at a secondary data store. Additionally, the method includes receiving an acknowledgment from the secondary data store that the data was written to a log at the secondary data store. Further, upon receiving the acknowledgment from the secondary data store, the method includes committing the data to the primary data store. The method also includes communicating an acknowledgement of committal of the data at the primary data store to the client. Additionally, the method includes communicating a commit ID from the primary data store to the secondary data store.

In another aspect, the present invention provides computer storage media having computer-executable instructions embodied thereon, that when executed by a computing system having a processor and memory, cause the computing system to perform a method for synchronously geo-replicating data in a distributed computing environment. The method includes receiving data at a primary data store from a client. Additionally, the method includes locking, at the primary data store, an object associated with the data. Further yet, the method includes communicating the data from the primary data store to a secondary data store with a record. Additionally, the method includes receiving a first acknowledgment from the secondary data store that the data was written to a log at the secondary data store. Upon receiving the first acknowledgment from the secondary data store, the method recites committing the data to the primary data store. Additionally, the method includes communicating, from the primary data store to the secondary data store, an instruction to commit the data. The method also includes receiving a second acknowledgment from the secondary data store. The second acknowledgment acknowledges that the data was committed at the secondary data store. Upon receiving the second acknowledgment at the primary data store, the method recites unlocking the object associated with the data. Additionally, the method recites communicating an acknowledgement of committal of the data at the primary data store to the client.

A third aspect of the present invention provides computer storage media having computer-executable instructions embodied thereon, that when executed by a computing system having a processor and memory, cause the computing system to perform a method for synchronously geo-replicating data in a distributed computing environment. The method is comprised of receiving data at a primary data store from a client. The method further comprises communicating the data and an identifier of the data that is generated within the distributed computing environment to facilitate synchronous committal of data to a secondary data store. The primary data store and the secondary data store are in different geographic regions. The method also recites receiving the data at the secondary data store. Additionally, the method is comprised of writing the data to a log at the secondary data store. Further yet, the method includes communicating, from the secondary data store to the primary data store, an acknowledgement of writing the data to the log. The acknowledgement includes at least a portion of the identifier. In response to receiving the acknowledgement of writing the data to the log, the method recites committing the data at the primary data store. Further, the method recites communicating an instruction to commit the data at the secondary data store. The instruction includes, at least in part, a portion of the identifier. The method also recites committing the data at the secondary data store.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, servers, routing devices, distributed computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," "server," "data store" etc., as all are contemplated within the scope of FIG. 1 and reference to "computer" or "computing device."

Computing device 100 typically includes a variety of computer-readable media. By way of example, and not limitation, computer-readable media may comprise the following non-transitory computer-storage media: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100. In an exemplary embodiment, the computer-readable media is a non-transitory media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like. It is understood that the computing device 100 may be manifested in a variety of forms. For example, portions of the computing device 100 may be physically located in a first geographic location while other portions may be physically located in a different geographical location. Consequently, it is contemplated that various devices, services, applications, and layers may be distributed across a variety of locations while still achieving the desired results traditionally applicable to the computing device 100.

Figure 2:
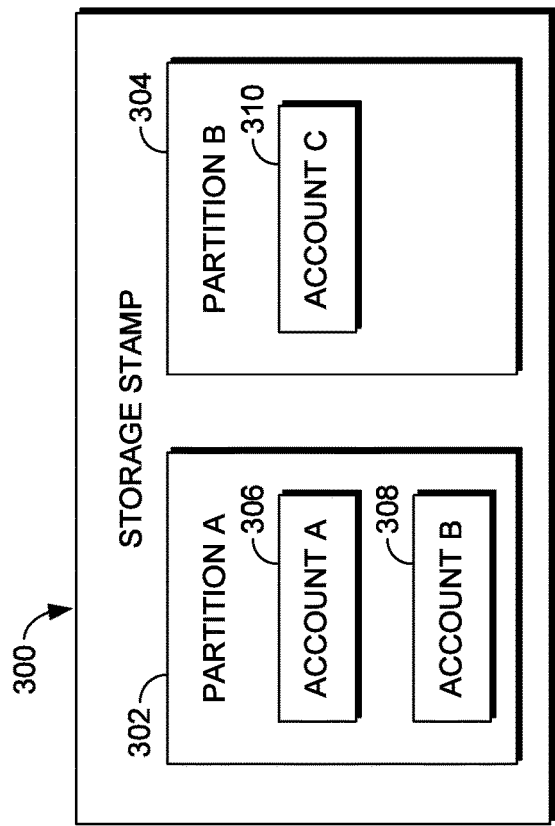
FIG. 2 depicts a block diagram illustrating an exemplary geographical region within a distributed computing environment, in accordance with embodiments of the present invention.

With reference to FIG. 2, a block diagram is provided illustrating an exemplary geographical region ("geo region") 200, in accordance with embodiment of the present invention. In general, a geo region is a collection of geographical locations grouped together by a political and/or governmental boundary. For example, a geo region may include the United States, a second geo region may include Europe, and a third geo region may include Asia-Pacific regions.

As will be discussed in greater detail hereinafter, a client may desire to replicate data within a particular geo region, but at different geographical location within the geo region. For example, a client may desire to maintain all of their data within the United States of America (as opposed to replicating the data in a different geo region) to be subjected to the laws governing the United States of America. But, because of a business continuity plan (disaster recovery plan), the client may require the data to be replicated in different geographical locations ("geo location") (to be discussed hereinafter) within the United States. As a result, the data may be accessed through a geo location A 202, which may be in a first geographic location. The data may then also be replicated in a second geo location B 204, which is geographically different from the geo location A 206.

A geo location is a geographical location that holds one or more storage stamps (to be discussed hereinafter). Examples of a geo location include a Seattle, Wash., USA-based grouping of storage stamps as a first geo location and a Des Moines, Iowa, USA-based grouping of storage stamps as a second geo location. Because of the substantial physical distance between Seattle and Des Moines, should a natural disaster or other business interfering activity occur in Seattle, Des Moines may be insulated from the effects of that activity.

A storage stamp (also referred to as a "data store" herein) is a collection of physical drives or other computer-readable memory, which may be coupled to one or more processors. For example, a storage stamp may be comprised a cluster of 10-20 racks of storage that maintains 2 to 20 petabytes of storage. It is contemplated that a storage stamp has greater or less storage capacity. Storage stamps associated with a common geo location may be geographically close in proximity (e.g., within a common data center). As a result of the relatively close proximity to one another, a high level of connectivity is generally present between storage stamps of a common geo location. However, because storage stamps are generally in close proximity to one another in a common geo location, an incident that causes the loss of connectivity of one storage stamp (e.g., natural disaster) may likely affect another storage stamp within that same geo location.

Therefore, it is an aspect of the present invention to allow for the replication of data between two or more storage stamps that may be geographically separate from one another. Consequently, it is contemplated that data maintained in a first storage stamp in a first geo location is replicated to a second storage stamp in a second geo location, such that the second geo location and the first geo location are geographically separated by a sufficient distance (e.g., 100 miles, 1,000 miles, 10,000 miles, 12,500 miles, etc.). It is contemplated that the second storage stamp is within the same geo region as the first storage stamp. Conversely, it is also contemplated that the second storage stamp is in a different geo location than the first storage stamp.

Returning to FIG. 2, the geo location A 202 and the geo location B 204 are located within the common geo region 200 (in this non-limiting example). The geo location A 202 is comprised of a storage stamp 206 and a storage stamp 208. Similarly, the second geo location B 204 is comprised of a storage stamp C 210 and a storage stamp D 212. As indicated previously, it is contemplated that a geo location may have any number of storage stamps of any size.

Embodiments of the present invention contemplate having a primary geo location and a secondary geo location where data is stored for a given account, or portions of an account. A customer associated with an account may, in an exemplary embodiment, select a primary geo location (e.g., geo location A 202). Further, it is contemplated that a secondary geo location (e.g., geo location B 204) is selected for the customer based on a number of criteria, either provided by the customer or based on reliability, redundancy, and/or availability measures. However, it is also contemplated that either the primary geo location and/or the secondary geo location are selected by the customer or selected for the customer.

Figure 3:
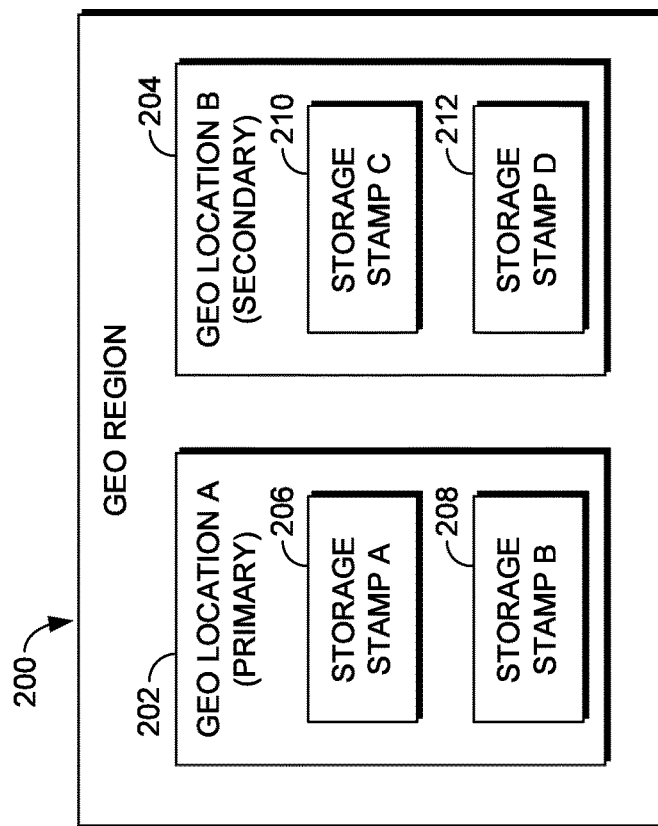
FIG. 3 depicts a block diagram of an exemplary storage stamp, in accordance with embodiments of the present invention.

Turning to FIG. 3, which illustrates a block diagram of an exemplary storage stamp 300, in accordance with embodiments of the present invention. The storage stamp 300, in an exemplary embodiment, may be located within the geo location A 202 of FIG. 2, previously discussed. A storage stamp may be comprised of a number of partitions. A partition is a subset of the storage capacity for a given storage stamp. Therefore, data stored to a storage stamp may be identified, at least in part, based on a partition identifier of a partition that stores the data. In an exemplary embodiment, partitions may be utilized to manage one or more accounts utilizing a storage stamp. However, it is contemplated that an account may utilize two or more partitions (as will be discussed hereinafter).

The storage stamp 300 is depicted as having a partition A 302, a partition B 304, and a partition C 306. The partition A 302, in this example, maintains data associated with an account A 306 and an account B 308. The partition B 304 maintains data associated with an account C 310. The partition C 305 also includes the account A 306. In an exemplary embodiment, the account A 306 is spread across multiple partitions, such as partition A 302 and partition C 305. It is understood that any number of accounts and any number of partitions may be provided in the above example, and the illustration is provided for explanation purposes.

Geo replication of data is contemplated as occurring at a number of different levels within a distributed computing environment. For example, it is contemplated that data stored on a given storage stamp is geo replicated to another storage stamp. Similarly, it is contemplated that data associated with a particular account is geo replicated. Further, it is contemplated that data maintained in a particular partition is geo replicated. Geo replication is therefore contemplated as being able to be performed at any level of granularity within the system.

In an exemplary embodiment, it is contemplated that geo replication occurs at the account level such that an account will have a primary geo location and one or more secondary geo locations assigned thereto. Geo replication at the account level may be important to allow the geo failover for a specific storage account that wants to migrate from one geo location to another geo location. Additionally, geo replication at the account level may allow a customer to turn on or turn off geo replication for a particular account to save resources (e.g., space, money). Further, it is contemplated that replication (e.g., geo replication) may be turned on or off for a portion of data associated with an account.

Figure 4:
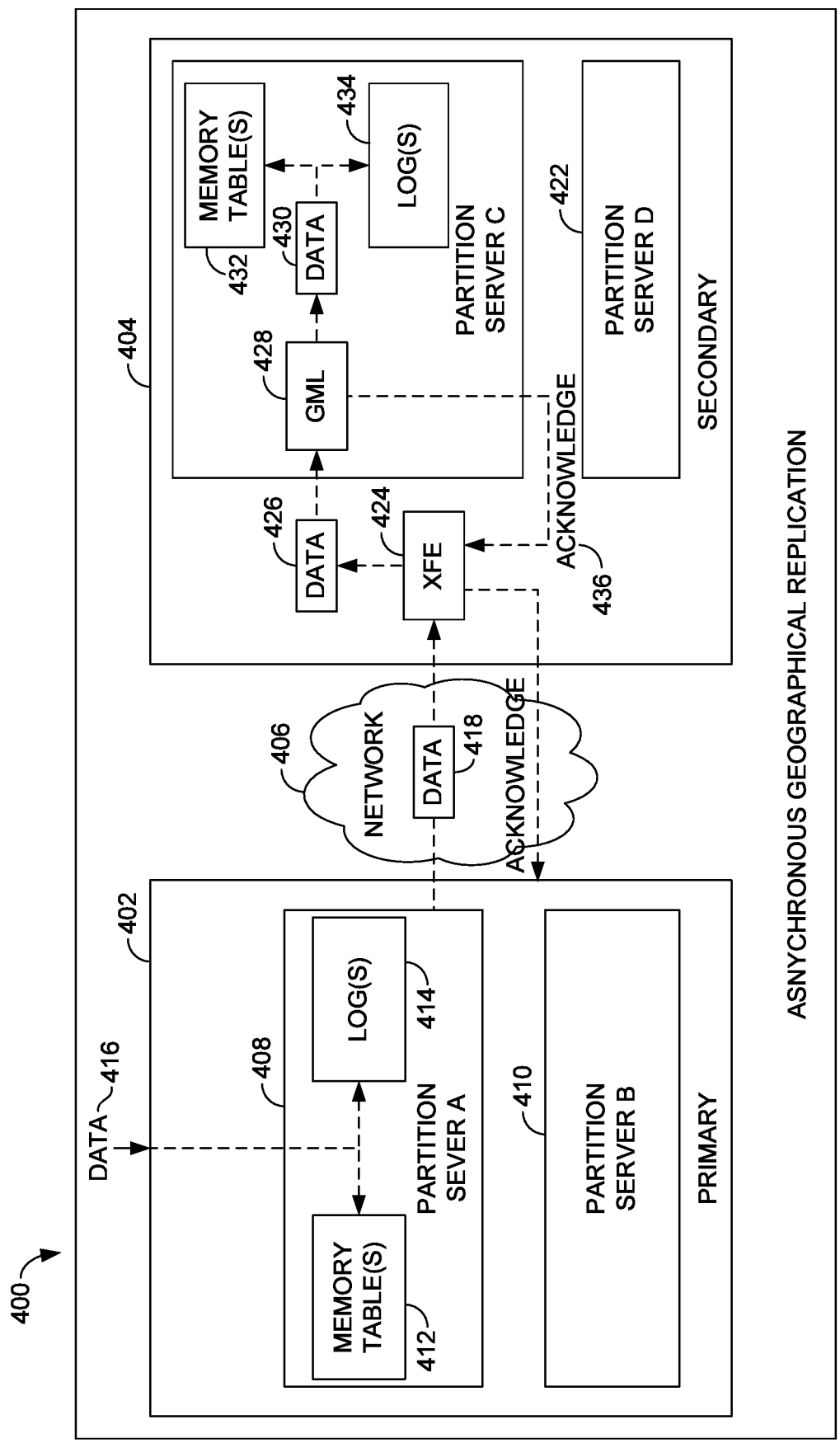
FIG. 4 depicts a block diagram of an exemplary system for geo replication of data, in accordance with embodiments of the present invention.

Turning to FIG. 4 illustrating a block diagram of an exemplary system 400 for geo replication of data, in accordance with embodiments of the present invention. The system 400 is comprised of a primary data store 402 and a secondary data store 404. The primary storage stamp is comprised of a plurality of partitions, such as a partition server A 408 and a partition server B 410. The partition server A 408, in this example, is comprised of a memory table 412 and a log 414.

In an exemplary embodiment, a partition server may be comprised of a plurality of memory tables and/or a plurality of logs. For example, a partition may be comprised of an update log, a block log, a page log, and/or a geo message log. In an exemplary embodiment, a log is located within a stream layer of a distributed computing environment such that the log is a discrete data stream that is append only.

A log stream may be relied upon to re-establish data of a storage stamp following a failure of a portion of a storage stamp (e.g., a storage node). For example, data may be committed to a storage stamp at a particular partition, but following the failure of the partition, the state of the partition is recreated, at least in part, by replaying one or more logs associated with that partition. Data may not be "committed" to a particular storage stamp until it is replayed (e.g., written into) one or more logs of the storage stamp. A distinction, in an exemplary embodiment, exists between data that is merely stored or written to a data stamp and data that is committed to the data stamp. For example, data may be written to a log of a storage stamp, but that data is not accessible to a client until the data is committed to the storage stamp. Committal of the data from a log, in an exemplary embodiment, may occur by the playing (or replaying) of the data from the log in order, which may not be strictly sequential, but instead merely in order.

As will be discussed hereinafter in more detail, data may be received in a non-sequential manner. However, it may be desired to commit the data in a sequential manner. In an exemplary embodiment, it may be desired to maintain the non-sequentially received data in a log until a portion of the data can be committed to the storage stamp in a sequential manner.

Returning to FIG. 4, the system 400 is comprised of a network 406. The various components of system 400 may communicate with each other via the network 406, which may include, without limitation, one or more local area networks (LANs) and/or wide area networks (WANs). Such networking environments are commonplace in offices, enterprise-wide computer networks, intranets, and the Internet. For example, in a distributed computing environment, it is common to allow for the communication of disparate components through a network. As such, the network 406 is not discussed in greater detail herein.

The secondary data store 404 is comprised of an XFE 424 (also referred to as a front end), a partition server C 420, and a partition server D 422. The partition server C 420, in this example, is comprised of a GML 428 (also referred to as a geo message log), a memory table 432, and a log 434. As previously discussed with respect to the partition server A 408, it is contemplated that one or more memory tables and/or one or more logs may be utilized in a given partition.

The XFE 424 is a front end service for a given stamp. Among other functions that an XFE is configured to handle, the XFE processes an incoming geo message, a message passed from one storage stamp to another storage stamp for geo replication purposes, to ensure the data received by the XFE is intended to be committed to an associated storage stamp. An XFE may also inspect transactions present in a geo message to identify a particular partition within the storage stamp to which the data is to be committed. An XFE may also be responsible for forwarding a geo message onto an appropriate partition and/or log, receiving acknowledgments of storing/committal of data, and/or providing an acknowledgment to one or more senders of the data as to the status of the data.

The GML 428 is a geo message log. In an exemplary embodiment, a geo message is written almost immediately, upon receipt at a secondary data stamp, in a GML. This near immediate writing of the geo message may allow for the secondary data store to provide an acknowledgement back to a supplying primary data store that the data has been written durably (but may not have yet been committed) at the secondary data store. In this example, the primary does not have to wait for the re-execution of some of the geo-transactions (e.g. portions of the geo message) on the secondary data store for success to come back. Consequently, the geo message is written to the GML, and then replayed a later time.

This process of utilizing the GML may decouple the primary data store from the secondary data store because the primary data store will not have its sending of geo messages blocked if there is a delay in replaying of the geo message on the secondary data store. In an exemplary embodiment, this may be important because if the primary is blocked, then it could start to backup. However, when the secondary data store is keeping up with the primary data store, the geo messages may be replayed directly from memory without having to use or, at least, read back from the GML.

It is contemplated that a GML may be bypassed completely in an exemplary embodiment. Instead, incoming geo messages may be written directly to one or more logs of the partition that directly support committing of data to the partition (or a check pointing process).

An exemplary flow of data to be geo replicated is illustrated with FIG. 4. For example, data 416 is received at the primary data store 402. In this example, the data 416 may be from a client (e.g., an application, a service, a program, etc.). Depending on if the data 416 is associated with an account, in this example, that requires asynchronous, synchronous with eventual consistency, or synchronous with strong consistency methodologies, the flow may be altered. However, for purposes of a general discussion, an asynchronous methodology is illustrated with FIG. 4. It is understood that the flow of data may be altered for other types or configurations of geo replication.

An account control unit ("ACU") may be configured to identify what accounts and what information within an account is intended to be geo replicated and how it is intended to be geo replicated. For example, an ACU may inspect the data 416 at the primary data store 402 to determine that the data 416 is associated with an account that desires asynchronous geo replication (for example). Each data stamp may have an ACU to control accounts at that stamp. For example, the Primary 402 has an ACU P 409, while the secondary has an ACU S 421.

In an exemplary embodiment, the ACU is a service running at each stamp. The ACU may be responsible for executing a sequence of operations at each storage stamp to perform replication processes. For example, the ACU may be responsible for turning replication on and off for an account at an associated storage stamp. As will be discussed hereinafter, a location service 403 may communicate with an ACU to issue high-level directives for various replication processes. For example, the ACU may communicate with a table master to execute various operations, such as partition splitting, merging, and replicating. The ACU may also receive other commands from the location service, such as a migration initialization command, a bootstrap command, or other replication oriented commands. An ACU may also track the progress of each command being performed on an account. The location service may then retrieve or receive updates from the ACU as to how the various stamps are progressing with their commands.

The location service 403, as indicated above, may be responsible for controlling high-level functions of replication. For example, a location service may maintain replication and migration assignments (e.g., what stamp is a primary and what stamp is a secondary for a given account). The location service may also serve as the highest authority in control of account replication. The location service, which may be computing device or a set of processes running in a computing environment, may be responsible for adding replication and migration states for storage accounts that are replicating/migrating between stamps.

In an exemplary embodiment, the location service 403 performs all storage account create, delete, and update transactions for all storage stamps that are a primary and/or a secondary for a given account. In this example, the location service 403 is able to maintain storage account information consistent across different stamps for the storage account, which may include create/delete account, change account permissions, and updating the account key for changing a domain name of an account. Further, the location service may communicate with a front end (e.g., XFE 424) and/or an ACU (e.g., ACU S 421) at a stamp to control and monitor operations at the stamp(s) for replication processes. Therefore, the location service 403 may be responsible for managing the overall process of replication while an ACU at each stamp may be responsible for communicating with the location service and monitoring performance of desired operations at a particular stamp.

As will be discussed hereinafter, the data 416 may be annotated with one or more records to facilitate replay of the data at the secondary data stamp (see later discussion of geo message annotated records). The annotated data, in this example, is data 418, which is communicated from the primary data store 402 to the secondary data store 404 by way of the network 406. The XFE 424 of the secondary data store 404 receives the data 418, which may be in the form of a geo message. The XFE 424 may then identify a transaction (e.g., portion within the data 418) that should be written to the GML 428 of the partition server C 420. For example, an account associated with the data 418 may be committed to the partition server C 420.

The portion of data communicated from the XFE 424 to the GML 428 is data 426. The data 426 may then be written (e.g., persisted) to the GML 428 for later committal to the partition server C 420. In this exemplary asynchronous geographical replication model, data replayed from the GML to be committed to the partition server C 420 is data 430. Data 430 may be a portion of data 426 or it may be a combination of a plurality of previously received data that are replayed in an ordered (e.g., sequential) manner for committal to the partition server C 420 through the entry of data 430 in the memory table 432 and/or the log 434. Further, it is contemplated that transactions (e.g., data) may be replayed out of order when the transactions replayed out of order are not dependent upon one another. This out-of-order replay allows for replay to occur at a faster rate. However, it is also contemplated that batch transactions, in an exemplary embodiment, requires the entire batch to be replayed or none of the batch to be replayed.

Returning to the GML 428. An acknowledgement 436 may be communicated from the GML 428 (or on behalf of the GML 428 by a service or control unit) to the XFE 424 indicating that the data 426 has been written to the GML 428. As a result, the XFE 424 (or on behalf of the XFE 424 by a service or control unit) communicates an acknowledgment 438 of the persistence of the data 416 (or data 418, or data 430) to the secondary data store 404. As will be discussed hereinafter, a commit ID may be updated, generated, and/or communicated from the primary data stamp as a result of receiving the acknowledgment 438.

In an exemplary embodiment, the data communicated from the primary data store 402 to the secondary data store 404 is in the form of a batched geo message. A batched geo message includes a number of transactions that may be destined for different partitions. The XFE 424 may identify the various transactions within a batched geo message and forward the appropriate transactions to the appropriate partitions, in this example. Continuing with this example, once the XFE 424 receives success from all of the partitions to which it sent transactions from the geo message, the XFE 424 may send the acknowledgment 438 to the primary data store 402 (or a particular primary that was a source of the geo message). At this point in the example, the data at the secondary data store 404 may not have been replayed from the GML 428 into one or more other logs (e.g., update log, blob log), which may occur later asynchronously. The primary data store 402 (or a source partition of the primary data store 402) may maintain the acknowledgements have been received back for a set of epoch # and/or sequence #'s (to be discussed hereinafter). Based on those acknowledgments received, the primary data store 402 determines if the commit ID can be advanced for inclusion with future geo messages.

The foregoing examples are provided to introduce concepts that will be discussed in greater detail hereinafter.

It should be understood that the arrangement illustrated in FIG. 4 and other arrangements described herein are set forth only as examples. Other arrangements and elements (e.g., machines, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Each of the components shown in FIG. 4 may be any type of computing device, such as computing device 100 described with reference to FIG. 1, for example. It should be understood that any number of data stores, partition servers, front ends, logs, networks, and/or memory tables may be employed within the system 400 within the scope of the present invention. Additionally other component not shown may also be included within the system 400.

Accordingly, any number of components may be employed to achieve the desired functionality within the scope of embodiments of the present invention. Although the various components of FIG. 4 are shown with lines for the sake of clarity, in reality, delineating various components is not so clear. Further, although some components of FIG. 4 are depicted as single blocks, the depictions are exemplary in nature and in number and are not to be construed as limiting.

Figure 5:
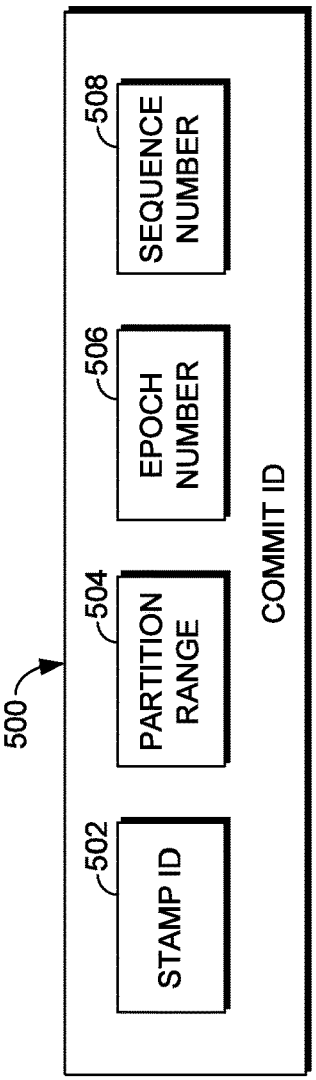
FIG. 5 depicts a block diagram of a commit identification (commit ID), in accordance with embodiments of the present invention.

Turning to FIG. 5, illustrating a block diagram of a commit identification ("commit ID") 500, in accordance with embodiments of the present invention. A commit ID is an identification utilized to ensure sequential committal of data during replication. Because embodiments of the present invention do not require the sequential communication of data (or receipt of data), a commit ID is utilized to ensure sequential committal of the data in a storage stamp. A commit ID may specify how far the destination partition can commit the geo messages/transactions (data) for that storage stamp and partition range. The commit ID may include (as illustrated in FIG. 5) a stamp ID 502, a partition number (#) 503, a partition range 504, an epoch number (#) 506, and/or a sequence number (#) 508. It is understood that a commit ID may contain more or fewer portions of information. However, in an exemplary embodiment, a commit ID contains at least an epoch # and a sequence #.

A commit ID in a synchronous replication methodology that has eventual consistency, a commit ID may be structured differently. For example, a commit ID sent to a secondary data store in a synchronous replication model having eventual consistency may be comprised of a listing of epoch #'s and sequence #'s to be committed at the secondary data store. As a result, when a primary data store receives an acknowledgement that a commit ID has been logged in a GML at the secondary data store, the commit ID at the primary data store may advance to the epoch # and sequence number to have been written to a log at the secondary data store. Stated differently, the commit ID communicated to a secondary data store may also be comprised of one or more epoch #'s and sequence #'s identifying through which point the secondary should committed since the previous commit ID.

When a partition loads, the latest commit ID may be identified and all transaction epoch #'s and sequence #'s that have yet to be committed are also identified. Those identified epoch #'s and sequence #'s are committed when the commit ID is advanced, as discussed above.

However, it is contemplated that a commit ID stored at a primary data store in a synchronous replication model having eventual consistency may be similar in structure to that which is used in an asynchronous model. For example, the commit ID may represent up through an epoch # and a sequence # written to a log (e.g., GML) of a secondary data store.

The stamp ID 502 is an identifier of a source stamp. For example, a stamp ID may uniquely identify a primary storage stamp supplying data to a secondary data stamp. The partition range 504 represents, in an exemplary embodiment, a source key range to which the commit advancement is to be applied. However, the partition range can be different than the source partition's key range or different from the partition range in a message ID, if the partition is committing in a parent's region but sending the transactions from its region.

An epoch # and a sequence # are sequential values that increase. For example, an epoch # may be conceptually thought of as a chapter number and the sequence # may be thought of as a chapter's page number that starts over with each new chapter. As a result, a particular transaction or a particular partition may be identified utilizing an epoch # and a sequence #. The epoch #506 represents an instance of the partition the commit is coming from (or associated with).

The sequence #508 (seq #) represents the latest sequential transaction to be committed. This tells a secondary storage stamp, that all transactions up to that epoch # and seq # can be committed on the secondary storage stamp. The epoch # changes every time there is a split or merge of the partition or partition reload. To allow out of order and parallel sending of geo messages (e.g., data) to the same secondary data stamps, the commit ID for a given transaction (transaction X) will be sent from the primary to the secondary after an acknowledgement for the geo message with the transaction is received back from the secondary and acknowledgements for all other geo messages with earlier transactions than the transaction X are received from the secondary.

A commit ID may accompany data sent from a primary data stamp to a secondary data stamp. For example, each geo message sent from a primary (data stamp/store) to a secondary (data stamp/store) may include a commit ID from the primary. Therefore, the primary may be piggybacking onto a given communication an identifier authorizing data up through a given commit ID to be committed at the secondary. In an exemplary embodiment, the commit ID indicates the largest consecutive transaction that has been written to a GML at the secondary for which the primary has received an acknowledgement back as to the writing of the transaction to the GML. Because an acknowledgement has been received back from the secondary, the primary can ensure that data at least through the commit ID is persisted to at least the GML of the secondary (if not already committed at the secondary).

Figure 6:
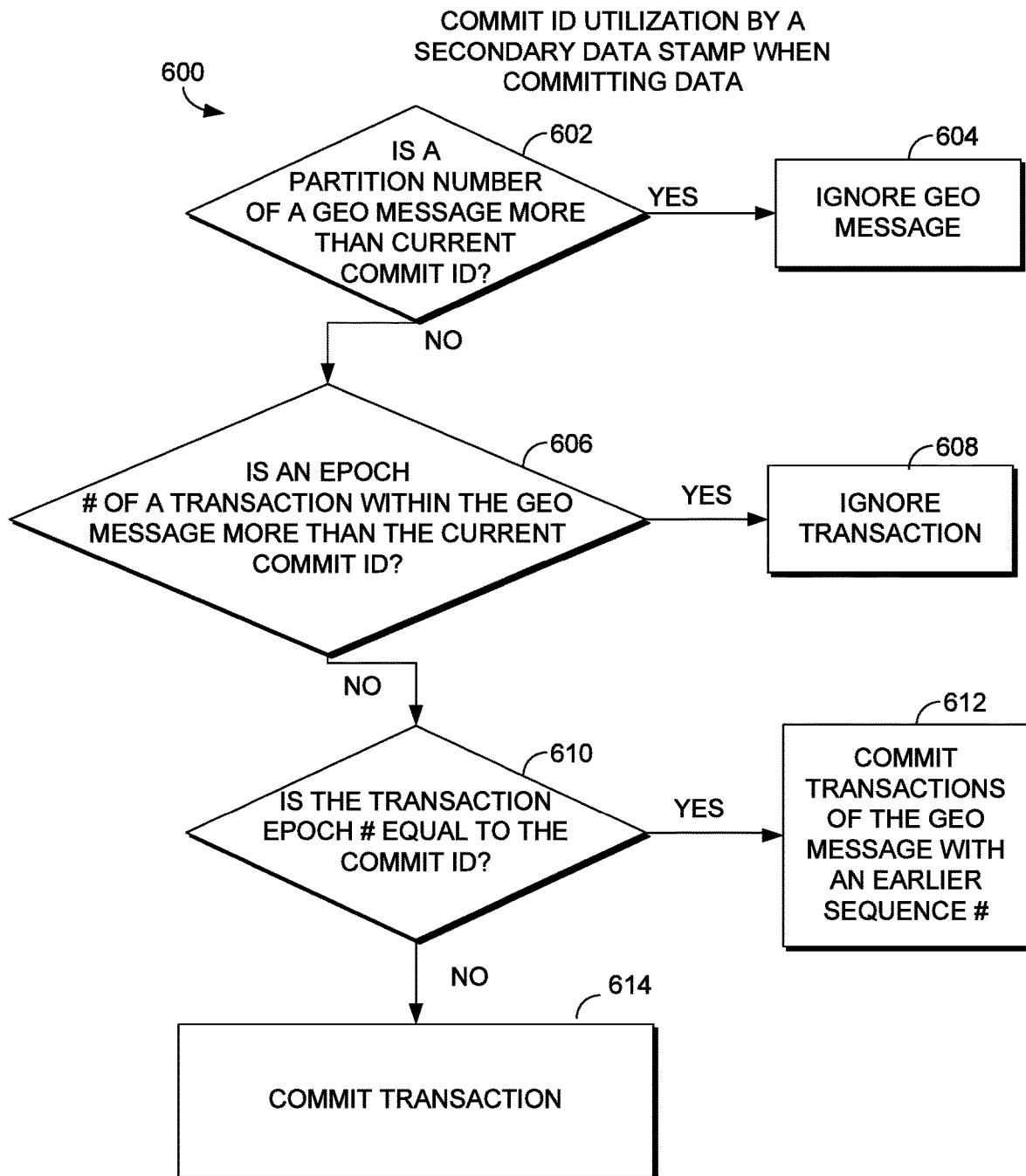
FIG. 6 depicts a method for determining how to handle a particular message relative to a commit ID, in accordance with aspects of the present invention.

However, it also contemplated that a commit ID is communicated at defined intervals or at defined periods of inactivity in commit ID communications to allow a secondary to make progress in committing data. This ensures that the latest commit ID for a source partition of a primary is sent to all of the partitions on a given secondary that may include a portion of the source partition's data. Consequently, the destination's partitions can make progress on committing the pending transaction waiting to be replayed from a GML. An example of how a secondary may utilize a commit ID for the sequential committal of data is illustrated in the exemplary block diagram of FIG. 6, representing a method 600 of determining how to handle a particular transaction relative to a commit ID, in accordance with aspects of the present invention. In this example it is assumed that a geo message is written to the GML of the secondary and a commit ID is received that is then evaluated to determine which geo messages are to be committed to the secondary from the GML.

At a block 602, a determination is made if a partition number of a geo message is more than a current commit ID. For example, a geo message may include a message ID that is comprised of a partition # identifying a source of the geo message. Similarly, a transaction within a geo message may have an epoch # and a sequence # associated with it. If the partition number of the geo message is more than the partition number of the commit ID, then the geo message may be ignored, as indicated at a block 604. As used here, "ignoring" of a geo message may merely mean that the geo message is not in a state to be committed (lack of prior sequential geo messages). In an exemplary embodiment, a partition # is used when a partition is reloaded to allow a secondary data store to ignore duplicate transactions for replay. When a partition is reloaded on the primary data store, it increments its partition # and the partition starts sending messages again from a last commit ID. Every geo message, in this example, has a partition # sent with it. The commit ID also has a partition #, which is a current partition # at the time of sending the commit ID.

A commit ID, in an exemplary embodiment, tells a secondary replay engine, an engine associated with the secondary data store that replays data, to do at least the following: (1) for any geo-messages that has a lower partition #, only replay the transactions up to the commit ID's epoch # and sequence #, (2) ignore all other transactions from the lower partition # if they have a higher epoch #/sequence #, since those are duplicates and will be resent from the primary partition.

However, if the determination of block 602 results in the partition number of the geo message not being greater than the current commit ID, the analysis moves to a block 606. At the block 606 a determination is made if an epoch # of each transaction in the geo message is more than the current commit ID. If the epoch # of the transaction is greater than the current commit ID, then those transactions may be ignored, as indicated at a block 608.

However, if the epoch number of the transaction is determined at block 606 to not be more than the commit ID, a determination if the epoch # of the transaction is equal to the commit ID is performed at a block 610. Because an epoch # may be changed with a split or merge of a partition, a lower epoch # indicates that all geo message transactions prior to the greater epoch number where persisted in a log (e.g., GML) of the secondary. Consequently, any geo message transactions persisted at the secondary that have an earlier epoch # than the commit ID's epoch # are committed to the secondary, as indicated at a block 614.

However, if the epoch number of the geo message is equal to the commit ID's epoch #, a determination if a sequence # of each transaction is more than the current commit ID's sequence # is performed, as indicated at a block 612. If the sequence number is greater than the commit ID, the geo message may be ignored. But, if the sequence # of the transaction in the geo message is not more than the current commit ID, then the transaction can be committed, as also indicate at the block 612. All transactions up to the largest sequence #s of the current epoch number of the commit ID are committed to the secondary, as indicated at the block 614.

While the above methodology is exemplary in nature, another methodology is contemplated for a synchronous replication having eventual consistency approach. The following exemplary process is simpler in nature than that which was discussed in FIG. 6. The simplicity is, in part, a result of limiting transactions committed at the secondary to those that are indicated in a listing of a commit ID. For example, only those transaction having an epoch # and a sequence # as indicated in a commit ID are committed to a GML of the secondary data store in this exemplary methodology.

An additional exemplary scenario includes what to do on "abrupt failover" in terms of the transactions still sitting in the GML. In the asynchronous approach, on an abrupt failover from a primary data store to a secondary data store due to a disaster, if the geo-messages are sent in parallel, not all of them may have been received at the secondary and there may be holes (non continuous numbering). If all of the geo-messages are received in order from a given bucket range, then those may be committed after the current commit ID up until a hole in the geo-message IDs for a given key range while flushing the GML at the secondary data store during failover. This applies to when sending geo-messages from a given primary partition in parallel. The customer may want to stop at a hole in the geo-message to have transactional ordering consistency across different objects. Note for a single object, there will never be holes, in an exemplary embodiment, in the data in the GML because updates to a single objects are serialized and batched up from the primary to the secondary. Even so, some customers may not care about this transactional ordering across objects and may want to just replay everything from the GML on an abrupt failover to avoid losing as much incremental updates as possible due to the disaster.

Now for the synchronous replication having eventual consistency approach, the transactions are not committed, in an exemplary embodiment, back to the customer until the updates have been written in the GML. This means that on an abrupt failover, commit may begin at the last commit ID and commit all of the transactions that are in the GML on the secondary after that commit ID. This allows this approach to provide strong consistency if the secondary becomes the new primary on failover due to a disaster.

Message IDs and Commit IDs may include an epoch # and a sequence #, as discussed above. A source partition, such as a partition from a primary data store, may have the following interactions with the epoch # value and the sequence # value. In an exemplary embodiment, each time a partition is loaded, split, or merged, the epoch # that is used for that resulting partition is set to be greater than the prior epoch # for a parent partition. However, it is contemplated that the epoch # for a partition will not change when the partition is still loaded. In this example, whenever an epoch number is changed (e.g., increased), the sequence number is reset to an initial value (e.g., 0). Further, in an exemplary embodiment, every transaction written into an update, block, and/or a blob log of the primary data store will contain an epoch # and a sequence #. These same numbers associated with a transaction are then utilized at a destination partition to allow replaying in an order. The primary only needs to keep track of the last commit ID that it communicated to the secondary; this may be maintained in a metadata stream/log or in the update/commit log. By only having to maintain the last commit ID communicated and the annotated data being communicated to the secondary, the process prevents having to send a second commit message to the secondary. Additionally, if the primary fails over, the primary can start by sending geo transactions starting at the last commit ID, which was maintained at the primary. A partition # allows a secondary data store to ignore duplicative transactions, because the same commit ID may be sent with a new partition #, which indicates that the secondary data store is to commit everything up to the commit ID except transaction with a greater epoch # and transactions with an equal epoch # that have a greater sequence #. These transaction may be ignored because they will be resent, in this example.

While the aforementioned discussion focuses on how the primary handles epoch and sequence #'s, the following focuses on how an exemplary secondary may handle epoch and sequence #'s.

Each secondary partition, in an exemplary embodiment, maintains a list of buckets representing commit IDs for each stamp ID within range of the destination partition (e.g., maintained in the update log, block log, page log, and/or metadata streams). This set of buckets, in this example, represents for each primary stamp ID, the most recent listing of committed partition range, epoch #'s, and sequence #'s of the most recent commit ID. Therefore, the buckets allow for each partition to maintain the epoch #'s and sequence #'s for that partition since each destination partition may receive requests from a plurality of source partitions (as will be discussed with FIG. 7 hereinafter). A partition # that may be passed with a geo message may be used to ignore portions of a geo message (or the entirety of a geo message) that may have been re-transmitted from the source partition (e.g., due to a source partition fail over). Additional uses of the partition #, epoch #, and sequence # by a secondary will be discussed hereinafter with respect to FIG. 8.

Figure 7:
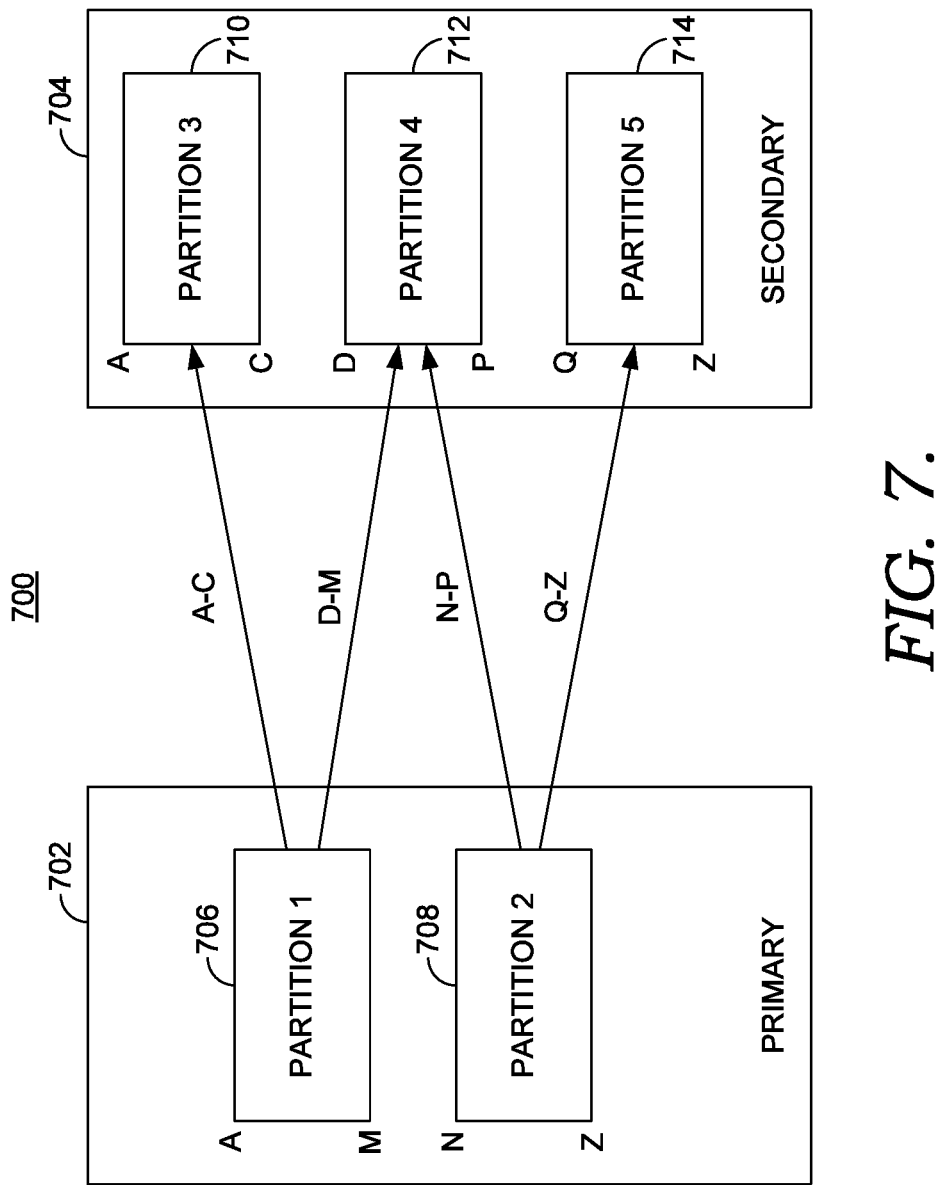
FIG. 7 depicts a block diagram of an exemplary system for passing data from a primary data store to a secondary data store, in accordance with embodiments of the present invention.

Turning to FIG. 7 that illustrates a block diagram of an exemplary system 700 for passing data from a primary 702 to a secondary 704, in accordance with embodiments of the present invention. As depicted in FIG. 7, a partition of the secondary 704 may receive data from a single partition or from a plurality of partitions.

The primary 702 is comprised of a partition 1 706 and a partition 2 708. The partition 1 706 includes data spanning from key ranges A through M. The partition 2 708 includes data spanning the key ranges of N through Z. However, the secondary 704 is comprised of three partitions that are intended to maintain the data of key ranges A through Z; therefore, an unparallel relationship between the primary 702 and the secondary 704 will result, in this example. The secondary is comprised of a partition 3 710, a partition 4 712, and a partition 5 714.

The partition 3 710 is intended to maintain data from the key ranges of A through C. The partition 4 712 is intended to maintain data in the key ranges of D through P. The partition 5 714 is intended to maintain data in the key ranges of Q through Z. In order to accomplish the task of committing data from a plurality of sources, bucket ranges may be maintained. Stated differently, the secondary may maintain range buckets that keep track of different commit IDs from the different source partitions. The range buckets may then be utilized by the secondary when replaying data from a log (e.g., GML) of the secondary to sequentially commit the data.

The utilization of range bucketing may be used as an optimization to reduce a number of partitions utilized by an account. For example, if an account is utilizing five partitions on the primary, but the data could be committed to two partitions, the secondary could commit the account's data in two partitions at the secondary during replication. Further yet, the concept of range bucketing may be implemented in situations where a GML at a secondary is unable to keep up with a source. In this situation, the destination partition at the secondary may instead split the data between two or more partitions, relying on range bucketing to facilitate later replay at each secondary. In this example, each of the secondary partitions that are used may have their own GML, which reduces the burden on a single GML.

For example, it a secondary data store has too much of a load, a determination may be made to split the partition. The determination may utilize ranges received from the primary data store as an indicator as to an appropriate split location.

Figure 8:
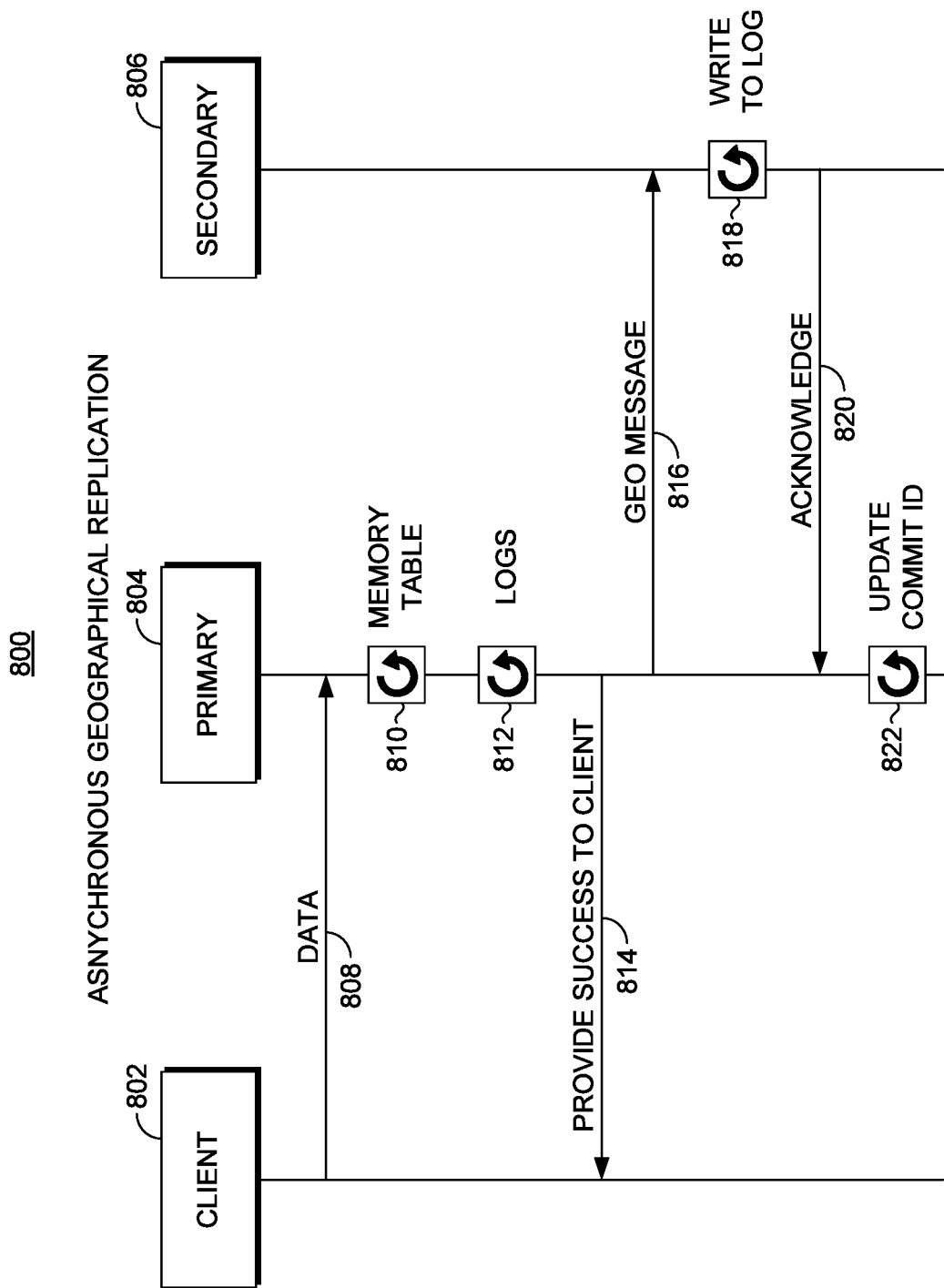
FIG. 8 depicts a block diagram illustrating a temporal flow for an exemplary asynchronous geo replication, in accordance with aspects of the present invention.

Turning to FIG. 8 that depicts a block diagram of process flow 800 of an asynchronous geo replication, in accordance with aspects of the present invention. The process flow 800, in this example, occurs between a client 802, a primary data stamp (primary) 804, and a secondary data stamp (secondary) 806. It is understood that additional entities, machines, components, applications, services, and the like may be incorporated into a process flow to effectuate asynchronous geographical replication.

The client 802 communicates data 808 to the primary 804. As previously discussed, the client 802 may be associated with an account that has been assigned to or has chosen to utilize the primary 804 as a primary geo location for committing data. The primary 804 may rely on an XFE to verify the data 808 is intended for the primary 804. Upon receiving the data 808, the primary 810 may write the data 808 to a log (or stream). The primary 804 may alternatively (or additionally) commit the data 808 to the primary 804. Committal of the data 808 may include persisting the data 808 to the memory table 810 and the logs 812 (in any order) of the primary 804.

In an exemplary embodiment, once the data has been written to a log or other data stream of the primary 804, an acknowledgement 814 of success may be returned back to the client 802. In an additional exemplary embodiment, once the data 808 is committed to the primary 804, the acknowledgement 814 is provided to the client 802.

By providing a success acknowledgement to the client 802 prior to actual committal of the data to a secondary geo location, the lapsed time between communicating the data from the client to receiving the confirmation of success may be reduced. However, as will be discussed in greater detail hereinafter, a synchronous geo replication methodology may also be implemented that provides a success acknowledgement back to the client once the data has been at least written (as opposed to full committal) to both the primary and the secondary. Synchronous geo replication may require a greater latency between communicating the data from a client to receiving an acknowledgement of success back from the primary (or the secondary).

Returning to FIG. 8, after providing the success acknowledgement 814, the primary 804 communicates a geo message 816 to the secondary 806. In an exemplary embodiment, a geo message is the data 808 that has been annotated with a record, such as a geo annotated record ("GAR"). In another exemplary embodiment, a geo message is a collection of transactions (collection of communicated data groupings) that have been batched to form a geo message for a particular geo location, stamp, and/or partition. A geo message may include a message ID that uniquely identifies that geo message (e.g., epoch # and sequence #). Further yet, a geo message may be further annotated to include a commit ID from the primary 804.

In an exemplary embodiment, a GAR is additional information stored with the transaction logs that will be used to replay/execute the log on the secondary stamp's partitions. There could be one GAR stored for each transaction. There can be many log entries making up a transaction, with a final commit log entry for the transaction. In this case, the GAR for the transaction could be stored with the final commit log entry. This information may indicate (a) what the original transaction was (e.g., Put Block, Put Block List, etc), which is used to determine how to correctly replay the transaction and hook things up at the destination, and (b) include additional information to re-execute the transaction at the destination (e.g., Last Modified Time, for Put Block List the final block list indicating if the blocks came from the committed or uncommitted list). In its most primitive form, the GAR may include the full incoming transaction to be performed on the primary, but there should be enough information included to completely and deterministically replay the transaction on the secondary, which results in more information being stored for the GAR depending upon the type of transaction. For example, this can include results calculated during the execution of the transaction, such as timestamps and ETags. In addition, the GAR may contain a transaction key record that is written in the primary logs and sent with every geo transaction to the secondary. This record may contain the key and the geo transaction id (e.g., epoch # and seq # from the primary) of the transaction.

Transactions executed on a partition server have one or more records written to one of three exemplary log streams (e.g., update log, block log, and page log). If a partition is reloaded on another node (e.g., data store) due to load balancing or node failure, the logs can be used to replay the transactions to regenerate the memory table. As a result, geo replication may not require additional log streams at a partition to allow the partition to be a source of geo replication. This is in part, because geo-transactions can be packaged up from the Update/Block/Page logs for live geo replication (and File Tables for bootstrap geo replication).

With geo replication, a GAR may be added to the transactions in the existing log streams. This GAR, along with what is already being written to the logs, may contain the additional information needed to re-execute/replay the transaction on the secondary storage stamp for geo replication. However, GARs may not have meaning for the replay of the logs at the primary. Instead, the GARs are there so that they can be passed to the secondary storage stamp to specify how to re-execute/replay the transaction at the secondary stamp. In addition, part of a GAR can also be generated dynamically from the information already in the logs, instead of storing it into the logs. In this case, the GAR is generated with the necessary condition and special values, and it is added to the geo message before sending it to the secondary.

A geo message, in an exemplary embodiment, may include 1) a message format version; 2) a field to say if the message is compressed or not; 3) a message accounts portion—this may be the list of storage account names the geo message represents. These accounts names may be validated by the XFE making sure that those accounts are marked as secondary at the stamp the message arrives at. A geo message may also include: 4) a table name; 5) a table version—schema version of the table; 6) a log record version—version number of the transaction log records in the message; 7) a field to say if the message is intended for fan out or not, where fan out means to send this message to all of the target partitions on the secondary for the partition range represented by the source partition. If fan-out is not specified, then it is acceptable to send the geo message to just the target partitions on the secondary with the storage accounts specified in the geo message.

The geo message may also be comprised of 8) a message ID—this represents the group of geo-transactions going from this partition to a given storage stamp. A message ID may include a) a stamp ID—source stamp; b) a partition #—this is used to identify all of the messages being sent from a given running instance of a partition. This is specifically used to deal with the issue of partition reload, and the fact that recent geo-transactions may be repackaged up differently and resent to the secondary partition, and the partition # is used to determine at the secondary when this potentially can happen. The message ID may also be comprised of c) a partition range—partition key range for the transactions in the message.

The geo message may also be comprised of 9) a commit ID—as previously discussed, this may include the information representing up to what epoch # and seq # from the source partition can be considered for committal at the secondary.

The geo message may also be comprised of 10) batches for each distinct partition key. This may represent a batch set of transactions as part of this geo message. If a set of geo-transactions has to be performed together, then they may be in the same batch. It is at the level of batches that the XFE can split the geo message across multiple different table servers if not all of the batches (based on the range) need to be sent to each of the destination table servers for the geo message. Each batch may contain a) partition keys; b) record offset and size in the records buffer for this partition key; and c) a list of geo transaction IDs and their key information used to replay the transaction and used to indicate when they can be committed on the secondary: 1. Partition Range—partition range for the batch; 2. Epoch #—All of the geo-transactions in the batch have to have the same Epoch #; 3. Seq #—There is a Seq # for each geo-transaction in this batch. Further, the geo message may also be comprised of 11) data log records for the transactions in the message Returning to FIG. 8, the geo message 816 is communicated to the secondary 806. A destination partition of the secondary 806 can see geo messages come in an out-of-order sequence (non-sequentially). However, an in-order commit may be enforced at the destination partition when the geo-transactions are replayed out of the GML of the secondary 806. The epoch # and seq # that is provided in a Message ID for the geo-transaction is used to provide in-order commit. Additionally, the destination partition can receive sequence numbers with holes and needs to know when to commit. The holes may occur when a source partition may sends transactions to N different destination partitions, so not every destination partition receives all transactions from a given source. The Stamp ID/Partition-Range/Epoch #/Seq # that is included with the Commit ID specifies how far the destination partition can commit the geo messages/transactions for that secondary and partition range.

The secondary 806 may then write the data of the geo message 816 to a log 818. In an exemplary embodiment, the log is a GML for a partition of the secondary 806. All of the incoming geo messages to a partition are stored into the partition's geo message log. Once a new geo message arrives at the secondary 806, the geo message it is stored into the GML and success is returned back to the XFE of the secondary 806, in this example. The geo message may contain a Commit ID that indicates if the committing of geo-transactions can move forward or not. Geo messages with earlier sequence numbers than those in the Commit ID can be committed, and those messages are replayed on the secondary 806 using annotation information discussed previously. During the replay on the secondary 806 the corresponding log records are stored into either an Update Log, a Block Log, and/or a Page Log, in this example, with whatever values that needs to be updated.

Continuing with this example, when the transaction is replayed from the GML, it is replayed into a corresponding Update/Block/Page logs with fields updated (e.g., TBL and CBL pointers) correctly. An advantage of starting with a separate GML (as opposed to using the existing logs) is that all of the geo message information is contained strictly in the GML. Then, after a geo-replay of the data is performed at the destination partition, everything is in the Update/Block/Page logs and Memory Table for the transaction to exist and logic does not have to be modified to deal with those logs or the replay of that information. This keeps the replay of geo messages from the GML separate from the partition replay log logic from its logs, especially since the partition replay logs may be kept small to have fast partition load time when a partition is reloaded on the secondary location.

In this example, replay from the GML into the Update/Block/Page logs and Memory Table commits the data into the live state of the partition before an update is generated to advance the "consumed" record for the GML. As a result, when reloading the partition on the secondary 806 (e.g., in the event of a failure) a point to start replaying from the GML should be determined. That point is determined by storing the "Consumed ID" with the geo-transactions that are stored into the Update/Block/Page logs during their replay. This Consumed ID may include the Stamp/PartitionKeyRange/Epoch/Sequence # of the last geo-transaction replayed from the GML. However, it is contemplated that the partition key range may not be stored because a transaction record may identify an appropriate key. In addition, a max Consumed ID may be maintained for a given part of the partition's key range, which is potentially stored in the GML each time a checkpoint is performed. The pointer to the checkpoint record may be stored in a metadata stream. Regeneration from a last point in the GML may be accomplished by taking the max Consumed ID from those stored in the checkpoint and those found when replaying from the Update/Block/Page logs.

Returning to FIG. 8, after writing the data to the log 818, the secondary 806 (e.g., by way of an XFE) may communicate an acknowledgement 820 to the primary 804 that the data has been written (or committed). The acknowledgement 820 may include a message ID associated with the geo message 816 to identify what epoch # and seq # has been written to the secondary 806. The primary may then update the commit ID 822. Eventually, either as part of a subsequent geo message or as a result of a fan-out-type message, the updated commit ID 822 may be communicated to the secondary 806 to allow for a greater amount of the data maintained in the GML to be committed at the secondary 806.

Figure 9:
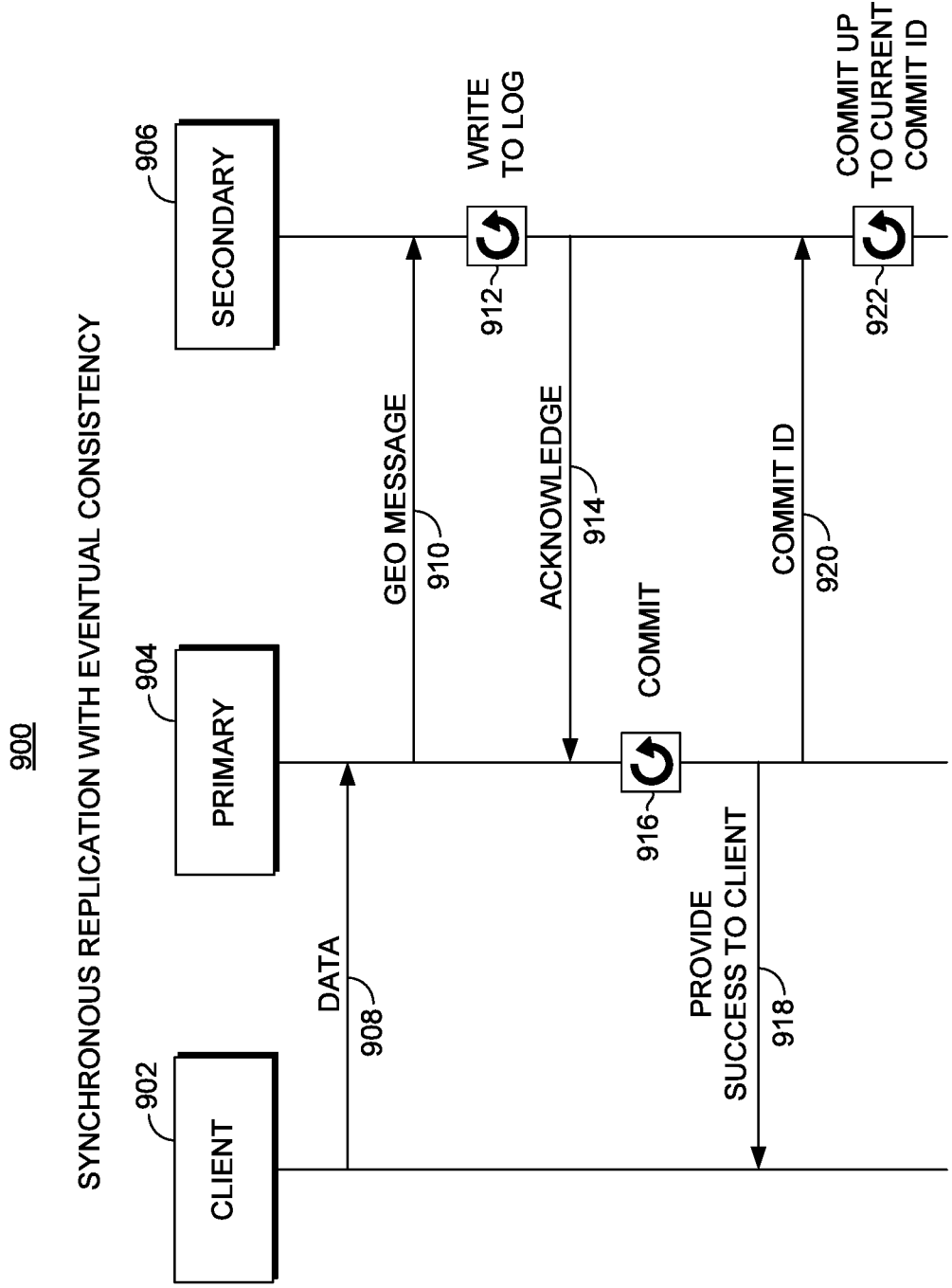
FIG. 9 depicts a block diagram illustrating a temporal flow for an exemplary synchronous replication with an eventual consistency methodology, in accordance with aspects of the present invention.

Turning to FIG. 9 that illustrates a block diagram 900 illustrating a temporal flow for a synchronous replication with eventual consistency methodology, in accordance with aspects of the present invention. Similar to those components discussed with respect to FIG. 8, the diagram 900 is comprised of a client 902, a primary 904, and a secondary 906.

In contrast to the exemplary asynchronous methodology described with respect to FIG. 8, synchronous geo replication only provides an acknowledgment back to the client 904 once the data has been at least written to the secondary 906 and the primary. This will be further contrasted from synchronous replication with strong consistency that will be discussed in an exemplary methodology of FIG. 10 that provides an acknowledgment to the client after the data has been committed to the secondary.

The client 902 communicates data 908 to the primary 904. Upon receiving the data 908, the primary 904 may write the data to one or more logs for later committal (not shown). Additionally, as previously discussed, the primary 904 may annotate the data 908 with one or more records, information and/or identifiers. For example, the data 908 may include a message ID, a commit ID, a GAR, and/or additional information useable for geo replication processes (e.g., replay at the secondary 906).

The primary 904 communicates a geo message 910 to the secondary 906. The geo message may be comprised of the data 908. The geo message may also be comprised of one or more additional portions of data, such as a discrete transaction. Additionally, it is contemplated that the geo message 910 also is comprised of a message ID associated with the geo message 910, a commit ID identifying an epoch # and a sequence # through which the secondary 906 is allowed to commit.

After receiving the geo message 910, the secondary 906 writes the associated data of the geo message 910 to an appropriate log 912. For example, an XFE of the secondary 906 may identify a particular partition within the secondary 906 to which the data of the geo message is to be written. Upon determining a particular partition of the secondary 906, the data relevant portions of the geo message may then be written to a GML of that identified partition of the secondary 906.

Additionally, the secondary 906 may inspect (not shown) a commit ID that has been received with the geo message 910. The commit ID, in this example, will not include the epoch # and sequence # specific to the geo message 910 because the primary has yet to receive an acknowledgment that the geo message 910 has been written to a log at the secondary 906. Therefore, the commit ID that may be received with the geo message 910 would have an epoch # and/or a sequence # that is less than the respective values associated with the geo message 910.

Returning to the illustrated exemplary methodology, the secondary 906 communicates an acknowledgement 914 of successful writing of the data of the geo message 910 to one or more logs of the secondary 906. In an exemplary embodiment, a GML of the secondary 906 provides an indication, to an XFE, of the successful writing of the data. The XFE of the secondary 906 then is responsible for providing the acknowledgement to the primary 904 (similar to the exemplary methodology previously discussed with respect to FIG. 4).

The primary 904, as a result of receiving the acknowledgement 914, commits 916 the data at the primary. As previously discussed, committing of the data may include writing the data to logs of the primary 904 as well as allowing a memory table to be populate with relevant entries, which allows data to be accessed by a requesting client. In an exemplary embodiment, data written to a log is not directly accessible by a requesting client unlike data that has been committed, which is directly accessible by the requesting client.

The primary 904, after confirming the data has been committed at the primary 904, communicates an acknowledgement 918 of success back to the client 902. The acknowledgement 918, in this example, indicates that the data 908 has been committed to the primary 904 and at the very least the data 908 has been written to a log of the secondary 906. The acknowledgment 918 may explicitly or implicitly indicate such information.

The primary may concurrently, prior to, or following the communication of the acknowledgment 918, communicate a commit ID 920 to the secondary 906. The commit ID 920 may be an updated commit ID that has been updated as a result of receiving the acknowledgment 914 from the secondary. As previously discussed, a commit ID, such as the commit ID 920, may be communicated to a secondary in conjunction with a geo message or it may be as a result of a fan-out-type message (e.g., expiration of a predefined time duration).

The secondary 906 commits data maintained in a log, such as the GML, having a consecutive message ID up through the commit ID. As previously discussed, the secondary may commit data in a sequential order based on an associated message ID. Therefore, if a gap exists between message IDs maintained in the log up through the commit ID, only that data associated with message IDs that are up to the gap in the consecutive message IDs are committed.

An exemplary embodiment of synchronous replication having eventual consistency approach is the following. The approach allows the primary data store to provide strong consistency. Then, if the secondary data store is only used for disaster recovery, which means it is not read from as long as the primary is alive, this approach can be used to provide strong consistency after disaster recovery failover. When failing over to the secondary data store, in this example, strong consistency can be ensured by the time reading on the secondary data store is allowed. This is done, in this exemplary embodiment, by not allowing the data on the secondary to be accessed until a final flush has occurred on the secondary after the failover. Another exemplary embodiment may allow the secondary data store to be read while the primary is still active. Applications allowed to read the secondary data store while the primary data store is active know that when they access the secondary data store that they will get eventual consistency. But, the primary data store is always accessed with strong consistency. After failover, the old secondary becomes a new primary, where the strong consistency is maintained since a flush of the remaining transactions occurred on the secondary from the GML to make it strongly consistent with the old primary.

Figure 10:
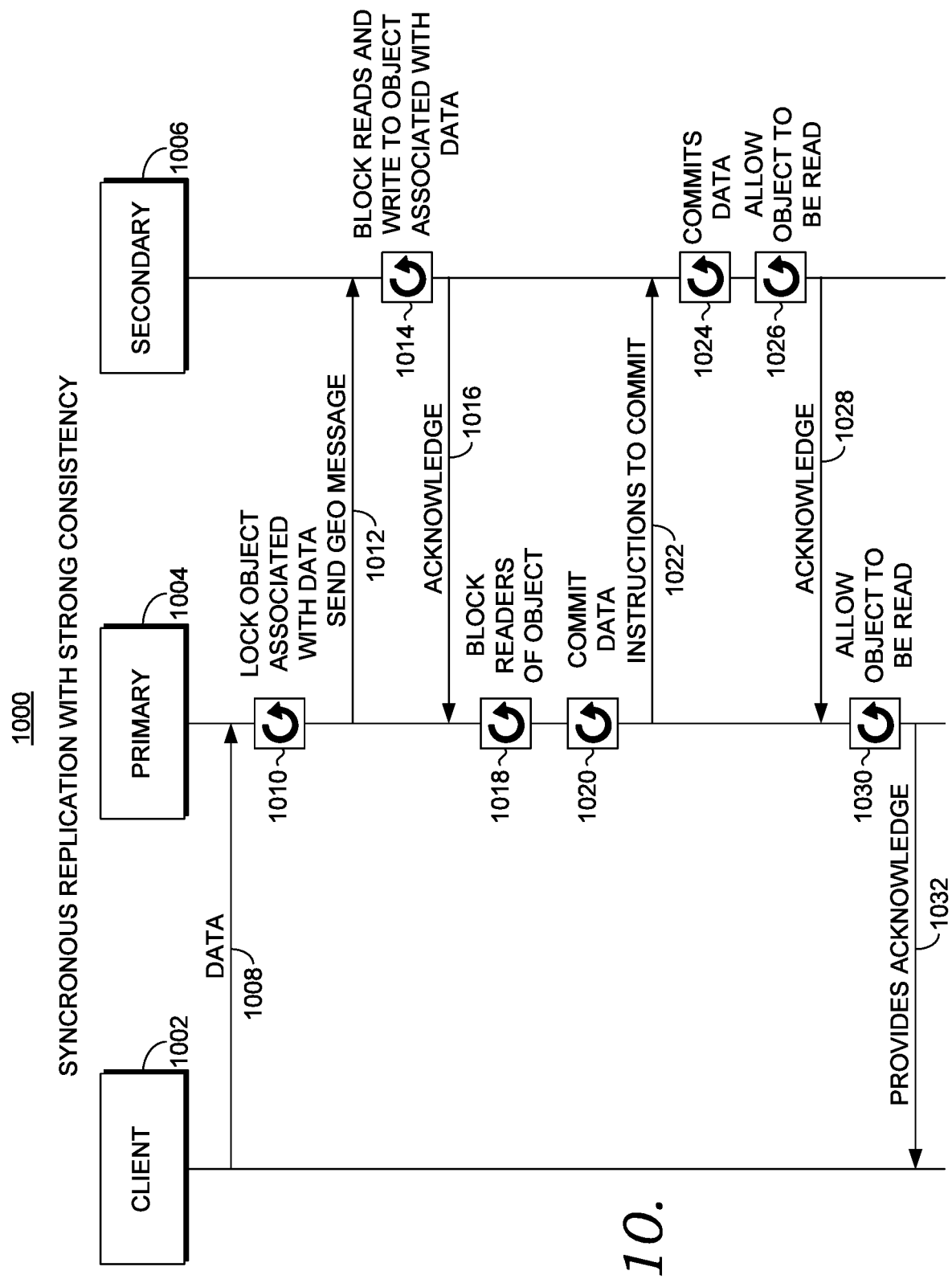
FIG. 10 depicts a block diagram illustrating a temporal flow for an exemplary synchronous replication with a strong consistency methodology, in accordance with aspects of the present invention.

Turning to FIG. 10 that illustrates a block diagram 1000 of an exemplary synchronous replication with a strong consistency methodology, in accordance with aspects of the present invention. Again, the diagram 1000 includes a client 1002, a primary 1004, and a secondary 1006.

The client 1002 communicates data 1008 to the primary 1004. The primary 1004 analyzes the data to determine an object associated with the data that is maintained within the primary 1004. After determining which object(s) are associated with the data 1008, the primary 1004 locks the associated object 1010 within the primary 1004. Locking of the object 1010 may include preventing a client from accessing the object, prevent writing to the object (other than the data 1008 to be written later), prevent reading of the object, or the like. Alternatively, locking of an object merely identifies that a transaction is pending with the object.

After locking the object 1010, the primary 1004 communicates a geo message 1012 to the secondary 1006. The geo message 1012 may include, among other information, the data 1008. As previously discussed, the geo message 1012 may be comprised of the data 1008, a message ID, a commit ID, a GAR, and other information facilitating geo replication.

The secondary 1006 blocks reads and writes to the object associated with the data 1008. The secondary may identify which object(s) is associated with the data 1008 independently (similar to the process implemented by the primary 1004), or the secondary may receive an indication as to which object(s) is associated with the data 1008 as part of the geo message 1012 from the primary 1004. After blocking the reads to the object 1014, the secondary 1006 communicates an acknowledgment 1016 to the primary 1004. The acknowledgment 1016 may include an indication of success of writing the data 1008 to a log, success of blocking reads/writes to the object 1014, and/or a message ID for the geo message 1012.

In this exemplary methodology, as will be discussed hereinafter, the primary commits a given portion of data prior to the secondary committing the similar portion of data. However, it is understood that the secondary could commit the data prior to the primary, which may reduce or at least alter one or more acknowledgments communicated between the primary and the secondary. In an exemplary embodiment, it is advantageous to commit the data at the primary prior to committing the data at the secondary as the primary is the first source of the data as requested by a client, so while an associated object may be locked (or blocked), having the data committed to the primary first may ensure the most recent information is available timely at the primary. Additional rationale is contemplated herein.

Returning to FIG. 10, after receiving the acknowledgement 1016, the primary blocks 1018 reads of the object associated with the data 1008. After blocking reads of the object, the primary 1004 commits 1020 the data 1008 to the primary 1004. After committing 1020 the data 1008, the primary 1004 communicates an instruction 1022 for the secondary 1006 to commit the data associated with the geo message 1012. The instruction 1022 may include the message ID previously associated with the geo message 1012. In this exemplary methodology, a commit ID may not be utilized since data is committed with strong consistency, meaning the subsequent updates to an object may not be executed until success of a previous transaction is received.

The secondary 1006 commits 1024 the data after receiving the instruction 1022 to commit the data. The secondary 1006 then removes the block and allows 1026 the object to be read by a requesting client. Once the object has been unblocked, the secondary 1006 communicates an acknowledgement 1028 to the primary 1004 indicating that the object is readable (and consequently the data has been committed). The primary 1004, upon receiving the acknowledgement 1028, also unblocks the object such that the object is placed in a state that allows 1030 the object to be read by a requesting client. Once the primary 1004 and the secondary 1006 allow an object associated with the data 1008 to be read, the primary 1004 communicates an acknowledgement 1032 to the client 1002 indicating that the data 1008 has been committed and geo replicated (with strong consistency).

Now that general overviews of exemplary embodiments for asynchronous replication and for synchronous replication have been introduced, the following is provided. In an exemplary embodiment, asynchronous replication considers data to be "committed" at the primary data store once it is modified, which allows an acknowledgment to be sent to the client. This data that is modified at the primary data store may then be lazily replicated in the background to the storage account's secondary geo location. In this example, the replication occurs off of the critical path of primary writes to reduce latencies within the environment. However, if a disaster occurs and the primary data store is lost, recent updates to the storage account at the primary may also be lost. To provide a higher level of confidence, synchronous replication ensures data is written to the primary and the secondary data stores before providing the client with an acknowledgment. Therefore, even if a disaster affects the primary data store, the data may be still accessible, but with a greater latency as a cost of synchronous replication.

The primary 904 communicates a geo message 910 to the secondary 906. The geo message may be comprised of the data 908. The geo message may also be comprised of one or more additional portions of data, such as a discrete transaction. Additionally, it is contemplated that the geo message 910 also is comprised of a message ID associated with the geo message 910, a commit ID identifying an epoch # and a sequence # through which the secondary 906 is allowed to commit, as well as the exact list of transactions epoch # and sequence #'s to commit since the last change in commit ID.

After receiving the geo message 910, the secondary 906 writes the associated data of the geo message 910 to an appropriate log 912. For example, an XFE of the secondary 906 may identify a particular partition within the secondary 906 to which the data of the geo message is to be written. Upon determining a particular partition of the secondary 906, the data relevant portions of the geo message may then be written to a GML of that identified partition of the secondary 906.

Additionally, the secondary 906 may inspect (not shown) a commit ID that has been received with the geo message 910. The commit ID, in this example, will not include the epoch # and sequence # specific to the geo message 910 because the primary has yet to receive an acknowledgment that the geo message 910 has been written to a log at the secondary 906. Therefore, the commit ID that may be received with the geo message 910 would have an epoch # and/or a sequence # that is less than the respective values associated with the geo message 910.

Returning to the illustrated exemplary methodology, the secondary 906 communicates an acknowledgement 914 of successful writing of the data of the geo message 910 to one or more logs of the secondary 906. In an exemplary embodiment, a GML of the secondary 906 provides an indication, to an XFE, of the successful writing of the data. The XFE of the secondary 906 then is responsible for providing the acknowledgement to the primary 904 (similar to the exemplary methodology previously discussed with respect to FIG. 4).

The primary 904, as a result of receiving the acknowledgement 914, commits 916 the data at the primary. As previously discussed, committing of the data may include writing the data to one or more additional logs of the primary 904 as well as allowing a memory table to be populate with relevant entries, which allows data to be accessed by a requesting client. In an exemplary embodiment, data written to a log is not directly accessible by a requesting client unlike data that has been committed, which is directly accessible by the requesting client.

The primary 904, after confirming the data has been committed at the primary 904, communicates an acknowledgement 918 of success back to the client 902. The acknowledgement 918, in this example, indicates that the data 908 has been committed to the primary 904 and at the very least the data 908 has been written to a log of the secondary 906. The acknowledgment 918 may explicitly or implicitly indicate such information.

The primary may concurrently, prior to, or following the communication of the acknowledgment 918, communicate a commit ID 920 to the secondary 906. The commit ID 920 may be an updated commit ID that has been updated as a result of receiving the acknowledgment 914 from the secondary. As previously discussed, a commit ID, such as the commit ID 920, may be communicated to a secondary in conjunction with a geo message or it may be as a result of a fan-out-type message (e.g., expiration of a predefined time duration).

The secondary 906 commits data maintained in a log, such as the GML. The commit ID sent from the primary may include a list of transactions, since the last commit ID changed, to commit from the GML. It contains an upper threshold epoch # and sequence # for the commit ID as described earlier, and it also contains for each transaction to be committed its epoch # and sequence #. This allows the replay from the GML to know exactly which transactions to replay/commit and which transactions to ignore. This is important because for the approach discussed with respect to FIG. 9, transactions are first written to the secondary GML before they are committed on the primary. This means that the secondary GML may have transactions written as part of its geo message that never get committed on the primary due to a failure on the primary partition after it has sent the geo-message to the secondary. This is why each advance in the commit ID also communicates to the secondary partition the exact transactions to commit since the last commit ID.

Turning to FIG. 10 that illustrates a block diagram 1000 of an exemplary synchronous replication with a strong consistency methodology, in accordance with aspects of the present invention. Again, the diagram 1000 includes a client 1002, a primary 1004, and a secondary 1006.

The client 1002 communicates data 1008 to the primary 1004. The primary 1004 analyzes the data to determine an object associated with the data that is maintained within the primary 1004. After determining which object(s) are associated with the data 1008, the primary 1004 locks the associated object 1010 within the primary 1004. Locking of the object 1010 may include preventing a client from accessing the object, prevent writing to the object (other than the data 1008 to be written later), prevent reading of the object, or the like. Alternatively, locking of an object merely identifies that a transaction is pending with the object.

After locking the object 1010, the primary 1004 communicates a geo message 1012 to the secondary 1006. The geo message 1012 may include, among other information, the data 1008. As previously discussed, the geo message 1012 may be comprised of the data 1008, a message ID, a GAR, and other information facilitating geo replication.

The secondary 1006 blocks reads (since in this exemplary embodiment, the secondary 1006 is a read-only data store) to the object associated with the data 1008. The secondary may identify which object(s) is associated with the data 1008 independently (similar to the process implemented by the primary 1004), or the secondary may receive an indication as to which object(s) is associated with the data 1008 as part of the geo message 1012 from the primary 1004. After blocking the reads/writes to the object 1014, the secondary 1006 communicates an acknowledgment 1016 to the primary 1004. The acknowledgment 1016 may include an indication of success of writing the data 1008 to a log, success of blocking reads/writes to the object 1014, and/or a message ID for the geo message 1012.

In this exemplary methodology, as will be discussed hereinafter, the primary commits a given portion of data prior to the secondary committing the similar portion of data. However, it is understood that the secondary could commit the data prior to the primary, which may reduce or at least alter one or more acknowledgments communicated between the primary and the secondary. In an exemplary embodiment, it is advantageous to commit the data at the primary prior to committing the data at the secondary as the primary is the first source of the data as requested by a client, so while an associated object may be locked (or blocked), having the data committed to the primary first may ensure the most recent information is available timely at the primary. Additional rationale is contemplated herein.

Returning to FIG. 10, after receiving the acknowledgement 1016, the primary blocks 1018 reads of the object associated with the data 1008. After blocking reads of the object, the primary 1004 commits 1020 the data 1008 to the primary 1004. After committing 1020 the data 1008, the primary 1004 communicates an instruction 1022 for the secondary 1006 to commit the data associated with the geo message 1012. The instruction 1022 may include the message ID previously associated with the geo message 1012. In this exemplary methodology, a commit ID may not be utilized since data is committed with strong consistency, meaning the subsequent updates to an object may not be executed until success of a previous transaction is received.

The secondary 1006 commits 1024 the data after receiving the instruction 1022 to commit the data. The secondary 1006 then removes the block and allows 1026 the object to be read by a requesting client. Once the object has been unblocked, the secondary 1006 communicates an acknowledgement 1028 to the primary 1004 indicating that the object is readable (and consequently the data has been committed). The primary 1004, upon receiving the acknowledgement 1028, also unblocks the object such that the object is placed in a state that allows 1030 the object to be read/written by a requesting client. Once the primary 1004 and the secondary 1006 allow an object associated with the data 1008 to be read/written, the primary 1004 communicates an acknowledgement 1032 to the client 1002 indicating that the data 1008 has been committed and geo replicated (with strong consistency).

Now that general overviews of exemplary embodiments for asynchronous replication and for synchronous replication have been introduced, the following is provided. In an exemplary embodiment, asynchronous replication considers data to be "committed" at the primary data store once it is modified, which allows an acknowledgment to be sent to the client. This data that is modified at the primary data store may then be lazily replicated in the background to the storage account's secondary geo location. In this example, the replication occurs off of the critical path of primary writes to reduce latencies within the environment. However, if a disaster occurs and the primary data store is lost, recent updates to the storage account at the primary may also be lost. To provide a higher level of confidence, synchronous replication ensures data is written to the primary and the secondary data stores before providing the client with an acknowledgment. Therefore, even if a disaster affects the primary data store, the data may be still accessible, but with a greater latency as a cost of synchronous replication.

Figure 11:
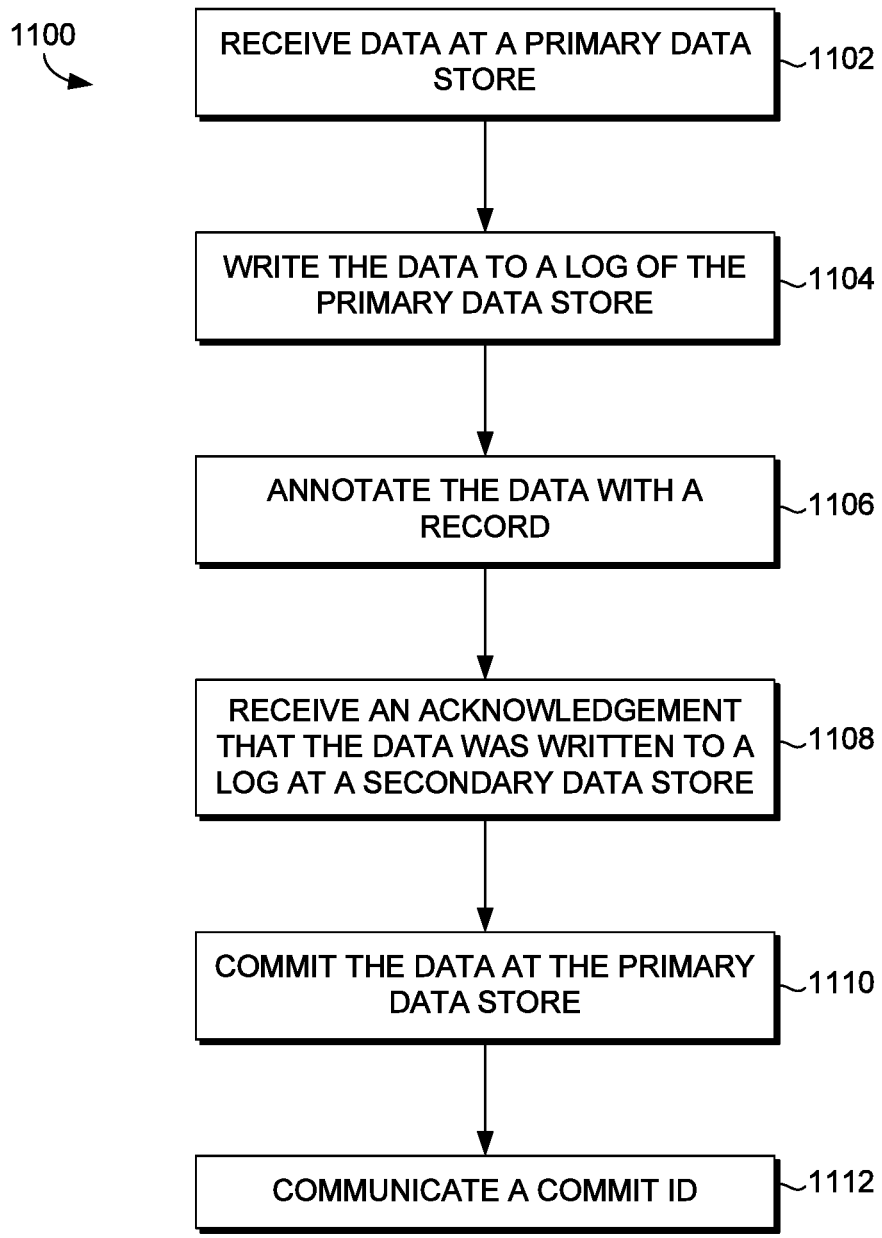
FIG. 11 depicts a synchronous replication methodology having eventual consistency from the perspective of a primary data store, in accordance with embodiments of the present invention.

Turning to FIG. 11 that depicts a synchronous replication methodology 1100 with eventual consistency from the perspective of a primary data store, in accordance with embodiments of the present invention. At a block 1102 a primary data store (e.g., storage stamp) receives data from a client. In this exemplary embodiment, the data is usable for updating an object utilized by the client to provide one or more services.

At a block 1104, the received data is written to a log of the primary data store. For example, an XFE may inspect the incoming data to determine that the primary data store is an appropriate data store for maintaining the incoming data. The XFE, in this example, may also identify an appropriate partition for maintaining the data. An appropriate partition may include a partition that is currently maintaining an object associated with the received data. Alternatively, it is contemplated that the data is written to one or more logs (e.g., update, block, and/or page) of the primary for committal of the data in accordance with the distributed computing system's processes. In an exemplary embodiment, the data written to a log of the primary is not accessible to a client (or other requesting entity) until it is committed to one or more logs and/or a memory table of the primary data store.

At a block 1106, the received data is annotated with a record. In an exemplary embodiment, the record is a GAR (discussed previously). It is also contemplated that the record annotated includes or is a message ID, or the like. For example, the record annotated to the data may allow for the data to be replayed at a secondary data store for committal at the secondary data store.

In an exemplary embodiment of the present invention, while not shown in FIG. 11, the primary data store communicates the data (or the annotated data) to the secondary data store. The secondary data store, upon receiving the data, writes the data to a log, such as the GML. As previously discussed, a front end service, such as the XFE, may provide an acknowledgement to the primary data store of successful writing of the data to a log. Block 1104 can be done in parallel with sending the data to the secondary and getting the acknowledgement back in block 1108.

At a block 1108, the primary data store receives an acknowledgement that the data was written to a log at the secondary data store. The acknowledgement, in an exemplary embodiment, is comprised of a message ID previously associated with the data written to the log at the secondary data store.

Further, it is contemplated that one or more steps may be performed in a different order or even consecutively. For example, block 1104 may occur in parallel with block 1108. Or, in an additional example, the block 1104 might just be buffered in memory, so there is no writing to the log until the commit on the primary at the block 1110.

In an exemplary embodiment, block 1108 will not wait for block 1104 to complete doing block 1108. This may be because block 1108 is the longest latency operation and it is fine if the transaction is written into the GML in block 1108 and it never gets recorded in the primary (e.g., the primary crashes). In this case, the primary when it reloads the partition will get a new epoch # and that transaction that hit the GML on the secondary that the primary doesn't know about either (a) won't get committed if the primary stays alive and advances the commit ID past it or (b) if the primary was permanently lost due to a disaster, it is fine to commit the transaction during failover, since the client of the original request may have timed out and not know if the transaction had been committed or not.

At a block 1110, the primary data store commits the data at the primary data store. In an exemplary embodiment, the data is not committed to the primary data store until the same (or similar data that has been annotated) is at least written to a log of the secondary data store as acknowledged by the secondary data store. In an exemplary embodiment, a commit ID is updated to reflect the recently committed data at the primary. In this example, the commit ID may be slightly different from previous examples. The commit ID, in this example, communicates the exact transactions through which the commit ID authorizes to be committed. This is in part a result of the secondary data store having potentially received and written data to the GML that may not have been committed to the primary data store. This allows the secondary to ignore the transactions that made it to the secondary data store, but were never committed to the primary. Note, the secondary could be used in two ways. If a customer client is allowed to read from the secondary while it performs read/write to the primary, then the client will see eventually consistent data from the secondary while it sees strongly consistent data from the primary. When there is a disaster and the system does an abrupt failover from the primary to the secondary, the secondary now becomes the new primary. For an abrupt failover due to a disaster, the secondary will commit/replay all of the remaining transactions in its GML after the latest Commit ID that was sent. This allows the secondary to fully catch up and be strongly consistent with the primary after failover. This allows the synchronous replication having eventual consistency replication approach to provide strong consistency when a failover occurs due to disaster recovery. In an embodiment, this allows what is considered to be the primary for the data to always provide a strongly consistent view of the data, even after failover.

At a block 1112, the primary data store communicates an acknowledgment to the client that the data received at the block 1102 is committed to the primary data store with eventual consistency at the secondary data store.

Advantageously, in an exemplary embodiment, if the secondary data store times out or time expires on the primary, the primary data store will not commit the data (e.g., because of a lack of acknowledgment from the secondary). When the primary data store fails to commit the data, the client never receives an acknowledgement for that data and may therefore try sending the information again. As a result, the client does not know if its update is in the store or not. This prevents on failover the secondary from having to communicate, in this exemplary embodiment, with the client to report when the data has been committed or even written. Additionally, if reads for an object are allowed from the secondary data store while the primary is taking read/write traffic, even though the data may be committed to the primary data store, the old values will be returned until the secondary data store commits the data.

Figure 12:
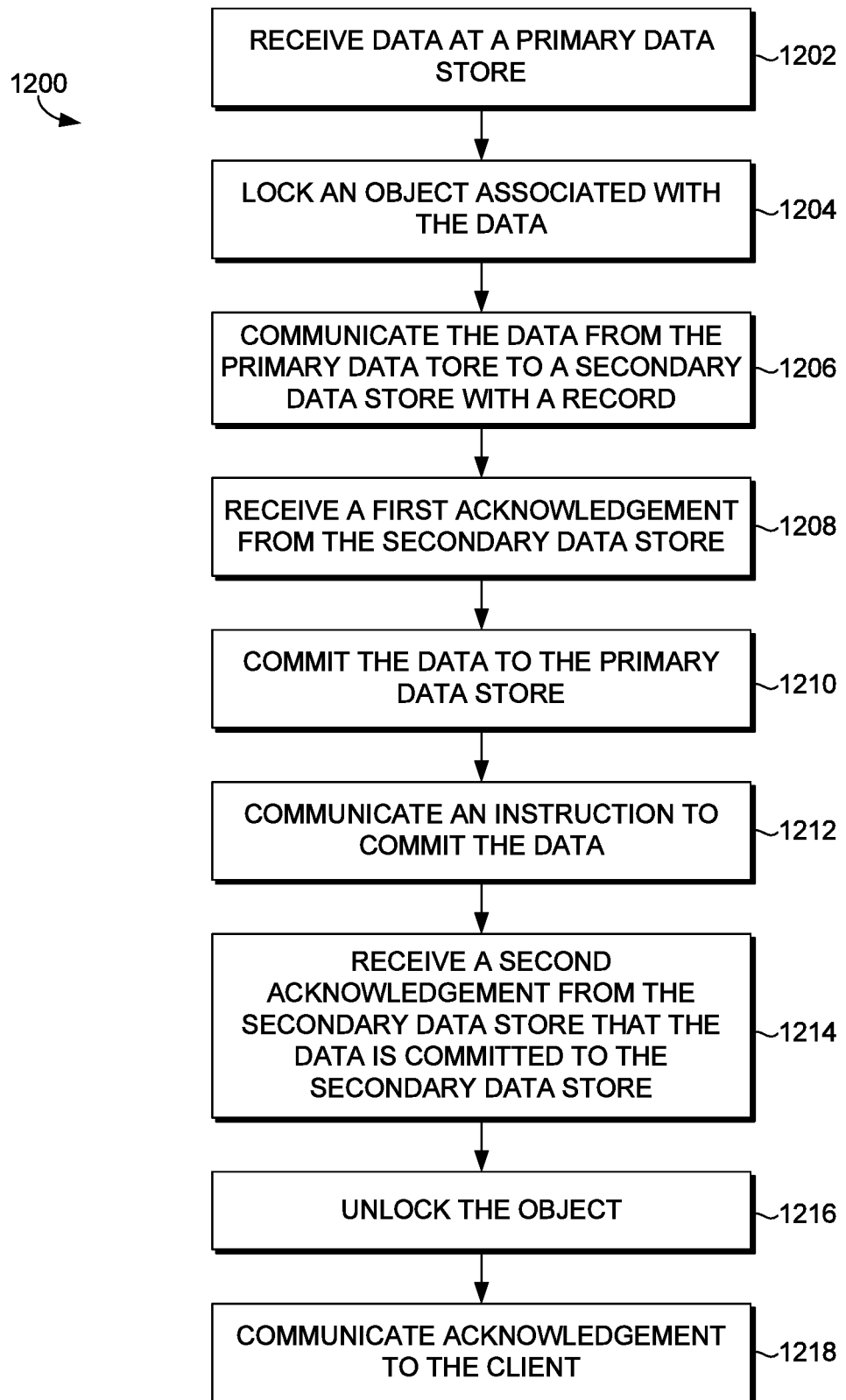
FIG. 12 depicts a synchronous replication methodology having strong consistency from the perspective of a primary data store, in accordance with embodiments of the present invention; and, FIG. 13 depicts a synchronous replication methodology from the perspective of a distributed computing system having both a primary data store and a secondary data store, in accordance with embodiments of the present invention.

Turning to FIG. 12 that depicts a synchronous replication methodology 1200 with strong consistency from the perspective of reading from a primary data store and secondary data store at the same time, in accordance with embodiments of the present invention. At a block 1202 a primary data store receives data from a client. In this exemplary embodiment, the data is useable for updating an object utilized by the client to provide one or more services.

At a block 1204, an object associated with the received data is locked. Locking of the object, in an exemplary embodiment, does not prevent reading of the data, but instead identifies that a transaction is starting for the object and prevents writing. It is further contemplated that a determination is made at the primary, or at a distributed component, as to which object or objects is/are associated with the data. The determination may be completed based on information included with the data, a naming structure, and a table look up, or the like. Further, it is contemplated that once an object is identified as being associated with the data, that association is annotated with the data for use by the secondary data store.

At a block 1206, the received data is communicated from the primary data store to the secondary data store. The communicated data includes a record. As previously discussed, the record may be comprised of a message ID, a GAR, and/or the like. The data may be received at the secondary data store and then inspected by a front end service to determine if the secondary data store is appropriate and which partition should receive the data.

At a block 1208, the primary data store receives a first acknowledgment from the secondary data store. The first acknowledgment, in an exemplary embodiment, includes a message ID for data written to a log of the secondary data store. The first acknowledgment may indicate that the secondary data store has written the data in a log, but has yet to commit the data.

At a block 1210, the primary data store commits the data and prevents read access to the object. In an exemplary embodiment, the primary data store only commits the data that has been identified in a received acknowledgment of success in writing data to a log. Therefore, it is contemplated that the primary data store does not commit data until that data has already been written to a log of the secondary data store. Further, in an exemplary embodiment, the primary data store does not commit data until the data has been written to a log of the secondary data store and the secondary data store has blocked access to the data (e.g., object).

At a block 1212, the primary data store communicates an instruction to commit the data at the secondary data store. The instruction to commit the data may include a message ID that is useable by the secondary data store to retrieve and commit the appropriate data from a log, such as the GML.

At a block 1214, the primary data store receives a second acknowledgment from the secondary data store that the data is committed to the secondary data store. In response to receiving this, the primary data store may unlock (or unblock reads and writes) the object associated with the data, as depicted at a block 1216. As a result, a client may access the object with new values provided by the committed data. Because, in this example, a strong consistency methodology is utilized, even if a failover occurs that requires accessing data at the secondary data store, the client may receive the updated data values for the object. This approach allows for a read from a primary or a secondary to result in a common data, even when both the primary and the secondary are active. However, the strong consistency does utilize a two-phase commit on a critical path of the client's transaction.

At a block 1218, the primary data store communicates an acknowledgment to the client indicating that the data has been replicated at the primary and the secondary data store. This indication may either be explicit or implicit.

Figure 13:
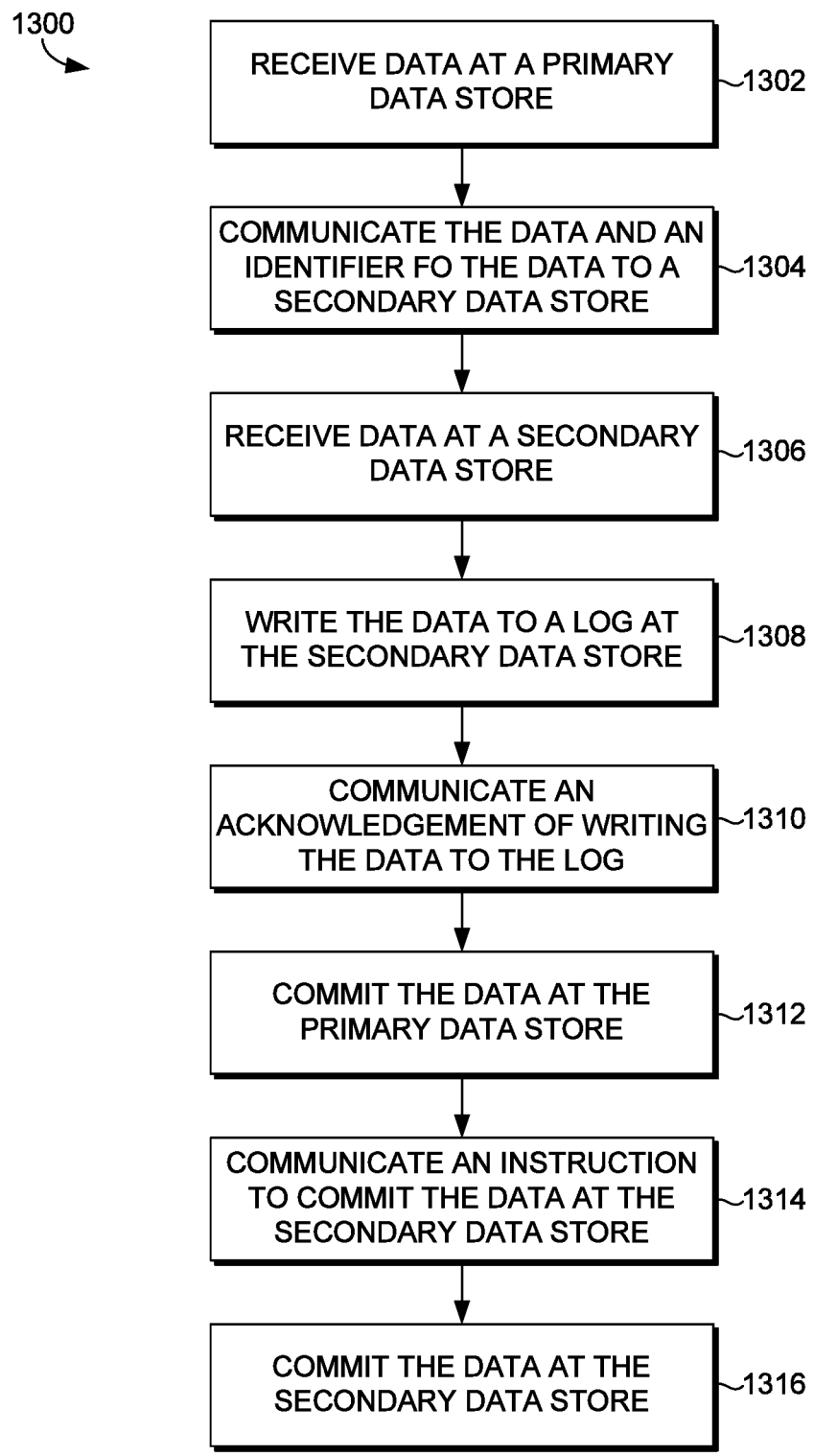

Turning to FIG. 13 that depicts a synchronous replication methodology 1300 from the perspective of a distributed computing system having both a primary data store and a secondary data store, in accordance with embodiments of the present invention. At a block 1302 the primary data store receives data from a client. In this exemplary embodiment, the data is useable for updating an object utilized by the client to provide one or more services.

At a block 1304, the primary data store communicates the data and an identifier of the data to the secondary data store. For example, the data may be annotated with additional information, such as a message ID that uniquely identifies that data based on a location or other topology structure where the data is (or will be) stored at the primary. Further, the unique identifier may merely provide a means for maintaining a sequential counter of messages/data communicated from the primary data store to a particular secondary data store or even a particular partition of the secondary data store.

At a block 1306, the secondary data store receives the incoming data and identifier from the primary data store. In an exemplary embodiment, the secondary data store may inspect the incoming data to ensure that the identifier indicates that the received data is greater c than a consumed ID (portion committed) for the secondary data store. Additionally, it is contemplated that the secondary data store may confirm that the received data is intended for a secondary data store and/or that the receiving data store is the proper recipient of the data.

At a block 1308, the secondary data store writes the data to a log. The log may be a specific log for enabling replication, such as a GML log. Additionally, it is contemplated that the log is one of a number of logs that are traditionally implemented in a distributed computing environment, such as a block, page, or update log. Once the data is written to the log, the log (or an associated process) may provide an acknowledgment back to a front end service.

At a block 1310, the secondary data store communicates an acknowledgment of writing the data to the log back to the primary data store from which the data was communicated. In an exemplary embodiment, a front end service that received an acknowledgment from the log to which the data was written may provide the acknowledgment to the primary data store. Further, it is contemplated that the acknowledgment may include an identifier of the data, such as a message ID that was previously associated with a geo message in which the data was packaged.

At a block 1312, the primary data store commits the data. In an exemplary embodiment utilizing an eventual consistency methodology, an acknowledgement of committal of the data may be sent to the client upon committal at the primary data store. This is, in part, because the secondary data store, which in this example has yet to commit the data, can replay the log to which the data is written to eventually commit the data. In an additional exemplary embodiment, an acknowledgement is not communicated to the client from the primary data store until both the primary and the secondary data store have committed the data, which provides a strong consistency methodology.

At a block 1314, the primary data store communicates an instruction for the secondary data store to commit the data. Depending on the consistency methodology implemented, the instruction may merely include a commit ID that encompasses the data to be committed. Alternatively, the instructions may specifically identify one or more transactions associated with the data, such that the instructions indicate that the specific transactions are to be committed.

At a block 1316, the secondary data store commits the data. In an exemplary embodiment, an acknowledgment of committal of the data is communicated from the secondary data store back to the primary data store. Further, it is contemplated that the secondary data store updates a consumed ID to indicate a range of data that has been committed from a log to the secondary data store. This consumed ID may be useable following a partition failure that requires a reloading of data to a memory table from checkpoints and log replays.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. While certain methodologies have been described in a particular sequence, it is contemplated that those activities may be performed in a variety of order and sequences.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for performing synchronous replication in a distributed storage environment, the method comprising:
   accessing, at a primary data store, a data portion from a client, wherein the primary data store and a secondary data store are configured for strong consistency synchronous replication;
   transmitting the data portion to the secondary data store;
   committing the data portion at the primary data store;
   transmitting instructions to cause committal of the data portion at the secondary data store;
   based on committing the data portion at the primary data store and causing committal of the data portion at the secondary data store, transmitting an acknowledgement of committing the data portion, wherein reads from the first primary data store and the secondary data store are blocked until after the data portion is committed at both the primary data store and the secondary data store.

2. The method of claim 1, wherein the primary data store is located in a first geo location, and wherein the secondary data store is located in a second geo location, wherein the client is associated with a first account assigned to the primary data store for committing data portion associated with the client, wherein the first account is associated with strong consistency synchronous replication for storing the data portion from the client, wherein at least a second account is associated with an eventual consistency synchronous replication for storing another data portion from a second client.

3. The method of claim 1, the method further comprising:
   annotating the data portion with an identifier record, wherein the identifier record supports storing the data portion at the secondary data store.

4. The method of claim 1, wherein transmitting the data portion to the secondary data store causes blocking of reads and writes of a secondary data store object representing the data portion.

5. The method of claim 1, the method further comprising:
   based on transmitting the data portion to the secondary data, receiving the acknowledgement of the transmittal of the data portion; and
   blocking reads of a primary data store object representing the data portion.

6. The method of claim 1, the method further comprising:
   based on the data portion being committed at the secondary data store, receiving an acknowledgement from the secondary data store that the data portion has been committed at the secondary data store.

7. The method of claim 1, wherein based on the data portion being committed at the primary data store and the secondary data, allowing reads and writes of a primary data store object representing the data portion, wherein the secondary data allows reads and writes of a secondary data store object representing the data portion.

8. One or more computer-storage media having computer-executable instructions embodied thereon that, when executed by a computing system having a processor and memory, cause the processor to perform operations associated with performing synchronous replication in a distributed computing storage environment, the operations comprising:
   accessing, at a primary data store, a data portion from a client, wherein the primary data store and a secondary data store are configured for strong consistency synchronous replication;
   transmitting the data portion to the secondary data store;
   committing the data portion at the primary data store;
   transmitting instructions to cause committal of the data portion at the secondary data store;
   based on committing the data portion at the primary data store and causing committal of the data portion at the secondary data store, transmitting an acknowledgement of committing the data portion, wherein reads from the first primary data store and the secondary data store are blocked until after the data portion is committed at both the primary data store and the secondary data store.

9. The media of claim 8, wherein the primary data store is located in a first geo location, and wherein the secondary data store is located in a second geo location, wherein the client is associated with a first account assigned to the primary data store for committing data portion associated with the client, wherein the first account is associated with strong consistency synchronous replication for storing the data portion from the client, wherein at least a second account is associated with an eventual consistency synchronous replication for storing another data portion from a second client.

10. The media of claim 8, wherein transmitting the data portion to the secondary data store causes blocking of reads and writes of a secondary data store object representing the data portion.

11. The media of claim 8, the operations further comprising:
   annotating the data portion with an identifier record, wherein the identifier record supports storing the data portion at the secondary data store;
   based on transmitting the data portion to the secondary data, receiving the acknowledgement of the transmittal of the data portion;
   blocking reads of a primary data store object representing the data portion; and
   based on the data portion being committed at the secondary data store, receiving an acknowledgement from the secondary data store that the data portion has been committed at the secondary data store.

12. The media of claim 8, wherein based on the data portion being committed at the primary data store and the secondary data, allowing reads and writes of a primary data store object representing the data portion, wherein the secondary data allows reads and writes of a secondary data store object representing the data portion.

13. A system for performing synchronous replication in a distributed storage environment, the system comprising:
   a first primary data store and a first secondary data store, wherein the first primary data store and the first secondary data store are configured for strong consistency synchronous replication, wherein strong consistency synchronous replication comprises:
      committing a first data portion at the first primary data store;
      transmitting the first data portion to the first secondary data store;
      committing the first data portion at first secondary data store; and
      based on committing the first data portion at the first primary data store and the first secondary data store, transmitting an acknowledgement of committing the first data portion, wherein reads from the first primary data store and the first secondary data store are blocked prior to transmitting the acknowledgement; and
   a second primary data store and a second secondary data store, wherein the second primary data store and the second secondary data store are configured for eventual consistency synchronous replication, wherein eventual consistency synchronous replication comprises:
      committing a second data portion at the second primary data store;
      recording the second data portion to a log at the second secondary data store, without committing the second data portion at the secondary data store;
      based on recording the second data portion at the log, committing the second data portion at the second primary data store;
      transmitting an acknowledgement of committing the second data portion; and
      based on the second data portion recorded at the log, committing the second data portion at the second secondary data store.

14. The system of claim 13, the strong consistency synchronous replication method further comprising:
   annotating the first data portion with an identifier record, wherein the identifier record supports storing the first data portion at the first secondary data store.

15. The system of claim 13, wherein transmitting the first data portion to the first secondary data store causes blocking of reads and writes of a first secondary data store object representing the first data portion.

16. The system of claim 13, the strong consistency synchronous replication method further comprising:
   based on the first data portion being committed at the first secondary data store, receiving an acknowledgement from the first secondary data store that the first data portion has been committed at the first secondary data store.

17. The system of claim 13, wherein based on the first data portion being committed at the first primary data store and the first secondary data, allowing reads and writes of a first primary data store object representing the first data portion, wherein the first secondary data allows reads and writes of a first secondary data store object representing the first data portion.

18. The system of claim 13, wherein transmitting the second data portion to the second secondary data store comprises transmitting a geo message, wherein the geo message comprises the second data portion and a commit ID.

19. The system of claim 13, the eventual consistency synchronous replication method further comprising:
   based on causing the recording of the second data portion to the log at the second secondary data store, receiving an acknowledgment from the second secondary data store that the second data portion has been recorded to the log.

20. The system of claim 13, wherein committing the second data portion at the second primary data store comprises writing the second data portion to one or more logs at the second primary data store, wherein a second primary data store object representing the second data portion is not accessible until after committing the second data portion at the second primary data store.

* * * * *